(12) United States Patent
Gupta et al.

(10) Patent No.: US 10,595,311 B2
(45) Date of Patent: Mar. 17, 2020

(54) ADAPTING TRANSMISSIONS IN MULTI-TRANSMISSION TIME INTERVAL (TTI) SIDELINK COMMUNICATION

(71) Applicant: QUALCOMM Incorporated, San Diego, CA (US)

(72) Inventors: Piyush Gupta, Bridgewater, NJ (US); Shrinivas Kudekar, Raritan, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 15/394,074

(22) Filed: Dec. 29, 2016

(65) Prior Publication Data

US 2018/0035427 A1    Feb. 1, 2018

Related U.S. Application Data

(60) Provisional application No. 62/368,473, filed on Jul. 29, 2016.

(51) Int. Cl.
| | | |
|---|---|---|
| *H04W 72/04* | (2009.01) | |
| *H04L 1/00* | (2006.01) | |
| *H04W 72/02* | (2009.01) | |
| *H04L 1/16* | (2006.01) | |
| *H04L 5/00* | (2006.01) | |

(52) U.S. Cl.
CPC ....... *H04W 72/0446* (2013.01); *H04L 1/0003* (2013.01); *H04L 1/0009* (2013.01); *H04L 1/0026* (2013.01); *H04L 1/1607* (2013.01); *H04L 5/0055* (2013.01);

(Continued)

(58) Field of Classification Search
CPC ... H04L 1/0003; H04L 1/0009; H04L 1/0021; H04L 1/0026; H04L 1/0068; H04L 1/0072; H04L 1/1607; H04L 5/0055; H04L 5/0057; H04W 72/02; H04W 72/0413; H04W 72/0446; H04W 72/1289
See application file for complete search history.

(56) References Cited

U.S. PATENT DOCUMENTS 9,609,637 B2 * 3/2017 Hammarwall ...... H04W 72/042
2005/0018638 A1 * 1/2005 Lindskog ................. G06F 1/32
370/338

(Continued)

OTHER PUBLICATIONS

International Search Report and Written Opinion—PCT/US2017/044000—ISA/EPO—dated Oct. 30, 2017.

(Continued)

*Primary Examiner* — Michael Thier
*Assistant Examiner* — Prince A Mensah
(74) *Attorney, Agent, or Firm* — Loza & Loza, LLP/Qualcomm

(57) ABSTRACT

Aspects of the disclosure relate to a sidelink signal communication scheme that provides for rapid adaptation of the sidelink transmission based on feedback received during each transmission time interval (TTI). In this way, any lack of precision in interference measurements, or rapid changes in the amount of interference, which otherwise might cause a modulation and coding scheme (MCS) that was selected for the sidelink transmission to be unsuitable, may be adapted to improve the reliability of the transmission. Other aspects, embodiments, and features are also claimed and described.

29 Claims, 19 Drawing Sheets

(52) U.S. Cl.
CPC ........... *H04L 5/0057* (2013.01); *H04W 72/02* (2013.01); *H04W 72/0413* (2013.01)

(56) References Cited

U.S. PATENT DOCUMENTS

| | | | |
|---|---|---|---|
| 2005/0025254 A1* | 2/2005 | Awad | H04L 1/0003 375/295 |
| 2006/0187964 A1* | 8/2006 | Li | H04W 74/002 370/474 |
| 2008/0101286 A1* | 5/2008 | Wang | H04W 72/1268 370/329 |
| 2008/0125137 A1* | 5/2008 | Rajkotia | H04L 1/0002 455/452.2 |
| 2010/0183087 A1* | 7/2010 | Hosokawa | H04B 7/0848 375/262 |
| 2011/0264976 A1* | 10/2011 | Yang | H04L 1/188 714/748 |
| 2013/0223485 A1* | 8/2013 | Bai | H04L 1/0068 375/219 |
| 2013/0322277 A1 | 12/2013 | Vanganuru et al. | |
| 2013/0322413 A1 | 12/2013 | Pelletier et al. | |
| 2014/0334392 A1 | 11/2014 | Gage et al. | |
| 2015/0270931 A1* | 9/2015 | Sun | H04L 1/0072 370/329 |
| 2016/0142991 A1* | 5/2016 | Classon | H04W 56/001 370/350 |
| 2017/0105165 A1* | 4/2017 | Nagasaka | H04W 24/02 |

OTHER PUBLICATIONS

Min-Seok Oh et al., "Scalable LDPC coding for OFDMA," Aug. 13, 2004, IEEE 802.16 Broadband wireless access working group, retrieved from google.com on Mar. 3, 2010, pp. 1-10.

Motorola: "Parameters for turbo rate-matching in LTE", R1-071795, St Julians, Malta, 3GPP TSG RAN1 #48bis, Mar. 26-30, 2006, pp. 1-3, XP002510979.

* cited by examiner

ADAPTING TRANSMISSIONS IN MULTI-TRANSMISSION TIME INTERVAL (TTI) SIDELINK COMMUNICATION

This application claims priority to and the benefit of provisional patent application No. 62/368,473, filed in the United States Patent and Trademark Office on Jul. 29, 2016, the entire content of which is incorporated herein by reference as if fully set forth below in its entirety and for all applicable purposes.

TECHNICAL FIELD

The technology discussed below relates generally to wireless communication systems, and more particularly, to rapid rate adaptation on a per-TTI basis in multi-TTI sidelink signal communications.

INTRODUCTION

In many existing wireless communication systems, a cellular network is implemented by enabling wireless user equipment to communicate with another by signaling with a nearby base station or cell. As a user equipment moves across the service area, handovers take place such that each user equipment maintains communication with one another via its respective best cell.

Another scheme for a wireless communication system is frequently referred to as a mesh or peer to peer (P2P) network, whereby wireless user equipment may signal one another directly, rather than via an intermediary base station or cell.

Somewhat in between these schemes is a system configured for sidelink signaling. With sidelink signaling, a wireless user equipment communicates in a cellular system, generally under the control of a base station. However, the wireless user equipment is further configured for sidelink signaling directly between user equipment without passing through the base station.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure describe a sidelink signal communication scheme that provides for rapid adaptation of the transmission based on feedback received during each transmission time interval (TTI). In this way, any lack of precision in interference measurements, or rapid changes in the amount of interference, which otherwise might cause a modulation and coding scheme (MCS) that was selected for the sidelink transmission to of a multi-TTI sidelink transmission be unsuitable, may be adapted to improve the reliability of the transmission.

In one example, a method of wireless communication operable at a transmitting device utilizing a sidelink signal is disclosed. The method includes transmitting one or more transport blocks during a plurality of transmission time intervals (TTIs) utilizing sidelink-centric subframes and utilizing a given modulation and coding scheme (MCS). The method further includes receiving feedback during each of the TTIs from a receiving device, the feedback comprising one or more of an acknowledgment/negative acknowledgment (ACK/NACK), channel quality information (CQI), or decoder state information for a decoder at the receiving device. The method further includes adapting the transmitting on a per-TTI basis in accordance with the received feedback.

According to the example, when the feedback comprises an ACK, the adapting the transmitting includes performing early termination of the transmitting. If the transmitting device has one or more further transport blocks to send, transmitting the one or more further transport blocks during TTIs reserved for the sidelink signal. If the transmitting device does not have further transport blocks to send, transmitting a signal to the receiving device explicitly releasing reserved resources for the sidelink signal. According to the example, when the feedback comprises a CQI above a high threshold or below a low threshold, the adapting the transmitting includes adapting the MCS in accordance with the received feedback on a per-TTI basis. According to the example, when the feedback comprises a NACK, the adapting the transmitting includes performing early termination of the transmitting, and beginning again to transmit the one or more transport blocks during a plurality of TTIs utilizing sidelink-centric subframes. According to the example, when the feedback comprises decoder state information for a decoder at the receiving device, indicating that transmission of parity bits would be insufficient for decoding the transport block at the receiving device, the adapting the transmitting includes shortening systematic bits (the original information bits) of one or more TTIs to calculate a modified parity transmission, transmitting the modified parity transmission, and re-allocating the shortened systematic bits for transmission during one or more subsequent TTIs. According to the example, the adapting the transmitting includes either performing early termination based on receipt of an acknowledgement (ACK) signal from the receiving device in a channel of the sidelink-centric subframe dedicated to sidelink feedback or performing a coding adaptation based on receipt of a decoder state from the receiving device in the channel of the sidelink-centric subframe dedicated to sidelink feedback. According to the example, when the adapting the transmitting includes performing early termination based on receipt of an acknowledgement (ACK) signal, the method further includes sending an explicit release signal to indicate that the device is releasing a sidelink resource.

In another example, a transmitting device configured for wireless communication utilizing a sidelink signal, includes a processor, a transceiver communicatively coupled to the processor, and a memory communicatively coupled to the processor. The processor is configured to utilize the transceiver to transmit one or more transport blocks during a plurality of transmission time intervals (TTIs) utilizing sidelink-centric subframes and utilizing a given modulation and coding scheme (MCS). The processor is further configured to utilize the transceiver to receive feedback during each of the TTIs from a receiving device, the feedback comprising one or more of an acknowledgment/negative acknowledgment (ACK/NACK), channel quality information (CQI), or decoder state information for a decoder at the receiving device. The processor is further configured to adapt the transmitting on a per-TTI basis in accordance with the received feedback.

According to the example, when the feedback comprises an ACK, the processor, being configured to adapt the transmitting, is further configured to perform early termination of the transmitting. The processor is still further configured to, if the transmitting device has one or more further transport blocks to send, utilize the transceiver to transmit the one or more further transport blocks during TTIs reserved for the sidelink signal. The processor is still further configured to, if the transmitting device does not have further transport blocks to send, utilize the transceiver to transmit a signal to the receiving device explicitly releasing reserved resources for the sidelink signal. According to the example, when the feedback comprises a CQI above a high threshold or below a low threshold, the processor, being configured to adapt the transmitting, is further configured to adapt the MCS in accordance with the received feedback on a per-TTI basis. According to the example, when the feedback comprises a NACK, the processor, being configured to adapt the transmitting, is further configured to perform early termination of the transmitting, and begin again to utilize the transceiver to transmit the one or more transport blocks during a plurality of TTIs utilizing sidelink-centric subframes. According to the example, when the feedback comprises decoder state information for a decoder at the receiving device, indicating that transmission of parity bits would be insufficient for decoding the transport block at the receiving device, the processor, being configured to adapt the transmitting, is further configured to shorten systematic bits of one or more TTIs to calculate a modified parity transmission. The processor is further configured to utilize the transceiver to transmit the modified parity transmission, and re-allocate the shortened systematic bits for transmission during one or more subsequent TTIs. According to the example, the processor is further configured to perform early termination based on receipt of an acknowledgement (ACK) signal from the receiving device in a channel of the sidelink-centric subframe dedicated to sidelink feedback or perform a coding adaptation based on receipt of a decoder state from the receiving device in the channel of the sidelink-centric subframe dedicated to sidelink feedback. According to the example, when adapt the transmitting includes performing early termination based on receipt of an acknowledgement (ACK) signal, the processor is further configured to send an explicit release signal to indicate that the device is releasing a sidelink resource.

In still another example, a transmitting device configured for wireless communication utilizing a sidelink signal, includes means for transmitting one or more transport blocks during a plurality of transmission time intervals (TTIs) utilizing sidelink-centric subframes and utilizing a given modulation and coding scheme (MCS). The transmitting device further includes means for receiving feedback during each of the TTIs from a receiving device, the feedback comprising one or more of an acknowledgment/negative acknowledgment (ACK/NACK), channel quality information (CQI), or decoder state information for a decoder at the receiving device. The transmitting device further includes means for adapting the transmitting on a per-TTI basis in accordance with the received feedback.

According to the example, when feedback comprises an ACK, the means for adapting the transmitting is further configured for performing early termination of the transmitting. The means for adapting the transmitting is still further configured to, if the transmitting device has one or more further transport blocks to send, transmitting the one or more further transport blocks during TTIs reserved for the sidelink signal, and if the transmitting device does not have further transport blocks to send, transmitting a signal to the receiving device explicitly releasing reserved resources for the sidelink signal. According to the example, when feedback comprises a CQI above a high threshold or below a low threshold, the means for adapting the transmitting is further configured for adapting the MCS in accordance with the received feedback on a per-TTI basis. According to the example, when feedback comprises a NACK, the means for adapting the transmitting is further configured for performing early termination of the transmitting, and beginning again to transmit the one or more transport blocks during a plurality of TTIs utilizing sidelink-centric subframes. According to the example, when feedback comprises decoder state information for a decoder at the receiving device, indicating that transmission of parity bits would be insufficient for decoding the transport block at the receiving device, the means for adapting the transmitting is further configured for shortening systematic bits of one or more TTIs to calculate a modified parity transmission, transmitting the modified parity transmission, and re-allocating the shortened systematic bits for transmission during one or more subsequent TTIs. According to the example, the means for adapting the transmitting is further configured for performing early termination based on receipt of an acknowledgement (ACK) signal from the receiving device in a channel of the sidelink-centric subframe dedicated to sidelink feedback, or performing a coding adaptation based on receipt of an updated decoder state from the receiving device in the channel of the sidelink-centric subframe dedicated to sidelink feedback. According to the example, when the means for adapting the transmitting is configured for performing early termination based on receipt of an acknowledgement (ACK) signal, the means for adapting the transmitting is further configured for sending an explicit release signal to indicate that the device is releasing a sidelink resource.

In still another example, a computer-readable medium storing computer-executable code at a transmitting device utilizing a sidelink signal is disclosed. The computer-executable code includes instructions for causing the transmitting device to transmit one or more transport blocks during a plurality of transmission time intervals (TTIs) utilizing sidelink-centric subframes and utilizing a given modulation and coding scheme (MCS). The computer-executable code further includes instructions for causing the transmitting device to receive feedback during each of the TTIs from a receiving device, the feedback comprising one or more of an acknowledgment/negative acknowledgment (ACK/NACK), channel quality information (CQI), or decoder state information for a decoder at the receiving device. The computer-executable code further includes instructions for causing the transmitting device to adapt the transmit on a per-TTI basis in accordance with the received feedback.

According to the example, when the feedback comprises an ACK, the instructions for causing the transmitting device to transmit further include instructions for performing early termination of the transmitting. The instructions for causing the transmitting device to transmit further include instructions for, if the transmitting device has one or more further transport blocks to send, transmitting the one or more further transport blocks during TTIs reserved for the sidelink signal.

The instructions for causing the transmitting device to transmit further include instructions for, if the transmitting device does not have further transport blocks to send, transmitting a signal to the receiving device explicitly releasing reserved resources for the sidelink signal. According to the example, when the feedback comprises a CQI above a high threshold or below a low threshold, the instructions for causing the transmitting device to transmit further include instructions for adapting the MCS in accordance with the received feedback on a per-TTI basis. According to the example, when the feedback comprises a NACK, the instructions for causing the transmitting device to transmit further include instructions for performing early termination of the transmitting, and instructions for beginning again to transmit the one or more transport blocks during a plurality of TTIs utilizing sidelink-centric subframes. According to the example, when the feedback comprises decoder state information for a decoder at the receiving device, indicating that transmission of parity bits would be insufficient for decoding the transport block at the receiving device, the instructions for causing the transmitting device to transmit further include instructions for shortening systematic bits of one or more TTIs to calculate a modified parity transmission, instructions for transmitting the modified parity transmission, and instructions for re-allocating the shortened systematic bits for transmission during one or more subsequent TTIs. According to the example, the instructions for adapting the transmitting include either instructions for performing early termination based on receipt of an acknowledgement (ACK) signal from the receiving device in a channel of the sidelink-centric subframe dedicated to sidelink feedback or instructions for a coding adaptation based on receipt of an updated decoder state from the receiving device in the channel of the sidelink-centric subframe dedicated to sidelink feedback. According to the example, when the instructions for adapting the transmitting include instructions for performing early termination based on receipt of an acknowledgement (ACK) signal, the instructions further include instructions for sending an explicit release signal to indicate that the device is releasing a sidelink resource.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Radio Access Network

Figure 1:
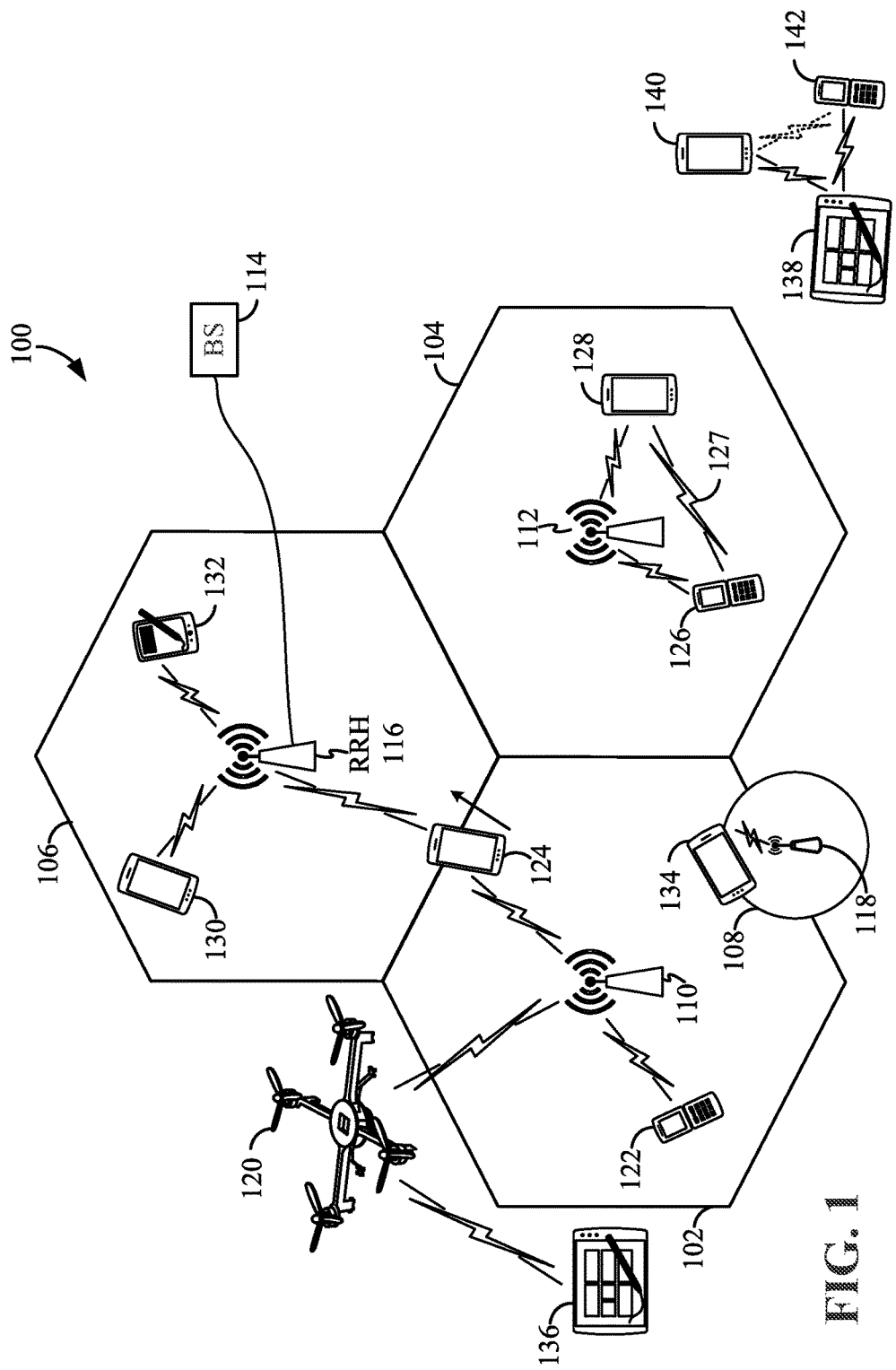
FIG. 1 is a diagram illustrating an example of an access network according to some aspects of the present disclosure.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. Further, a relay node may be deployed to extend the size or coverage area of a given cell.

The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the drone 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc.

A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station (e.g., drone 120). Here, each base station 110, 112, 114, 118, and 120 may be configured to provide an access point to a core network (not shown) for all the UEs in the respective cells.

In another example, a mobile network node (e.g., drone 120) may be configured to function as a UE. For example, the drone 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or data from a base station (e.g., base station 110) to one or more UEs (e.g., UEs 122 and 124) may be referred to as downlink (DL) transmission, while transmissions of control information and/or data originating at a UE (e.g., UE 122) may be referred to as uplink (UL) transmissions. In addition, the uplink and/or downlink control information and/or data may be transmitted in transmission time intervals (TTIs). As used herein, the term TTI may refer to the inter-arrival time of a given schedulable set of data. In various examples, a TTI may be configured to carry one or more transport blocks, which are generally the basic data unit exchanged between the physical layer (PHY) and medium access control (MAC) layer (sometimes referred to as a MAC PDU, or protocol data unit). In accordance with various aspects of the present disclosure, a subframe may include one or more TTIs. Thus, as further used herein, the term subframe may refer to an encapsulated set of information including one or more TTIs, which is capable of being independently decoded. Multiple subframes may be grouped together to form a single frame or radio frame. Any suitable number of subframes may occupy a frame. In addition, a subframe may have any suitable duration (e.g., 250 μs, 500 μs, 1 ms, etc.).

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the access network 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per subframe.

In the radio access network 100, the ability for a UE to communicate while moving, independent of their location, is referred to as mobility. The various physical channels between the UE and the radio access network are generally set up, maintained, and released under the control of a mobility management entity (MME). In various aspects of the disclosure, an access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the access network 100. Each of the cells may measure a strength of the pilot signal, and the access network (e.g., one or more of the base stations 110 and 114/116 and/or a central node within the core network) may determine a serving cell for the UE 124. As the UE 124 moves through the access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Signaling Entities

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
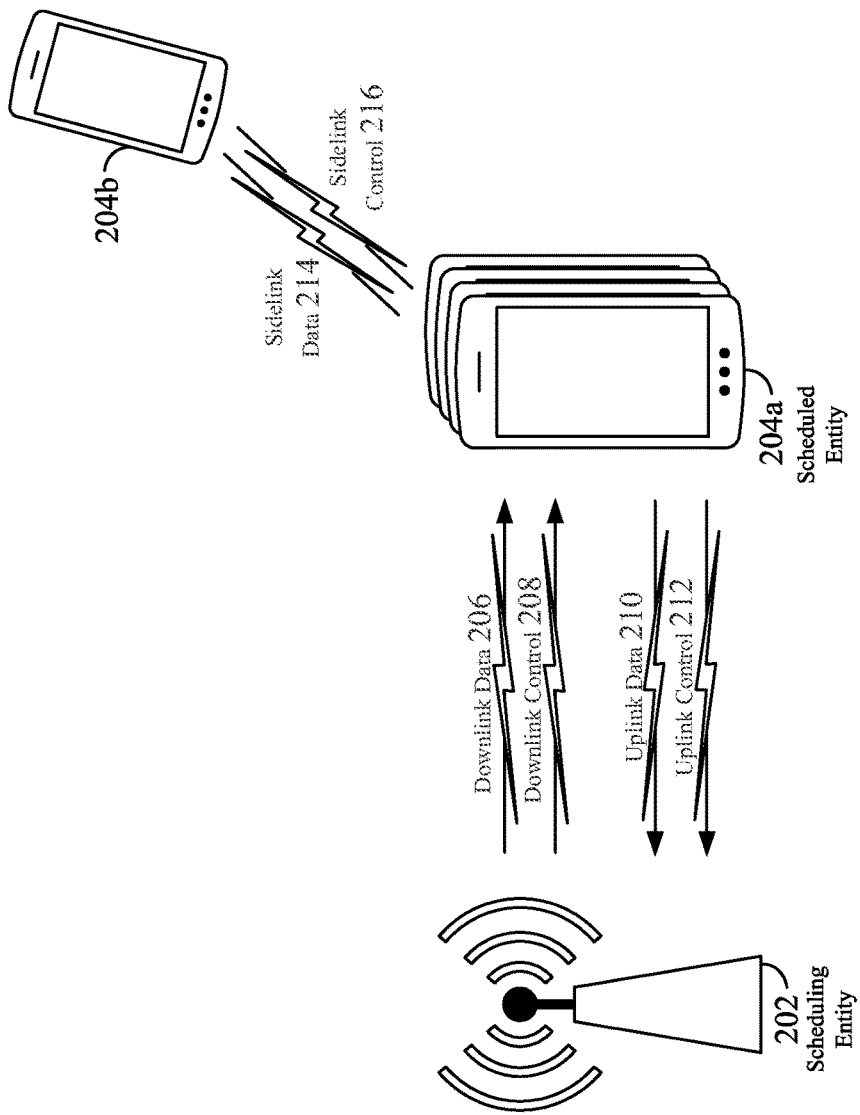
FIG. 2 is a diagram conceptually illustrating an example of a scheduling entity communicating with one or more scheduled entities according to some aspects of the present disclosure.

Thus, in a wireless communication network with scheduled access to time—frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204*a* and 204*b*). Here, the scheduling entity 202 may correspond to a base station 110, 112, 114, and/or 118. In additional examples, the scheduling entity 202 may correspond to a UE 138, the quadcopter or drone 120, or any other suitable node in the access network 100. Similarly, in various examples, the scheduled entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast data 206 to one or more scheduled entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink data 210 and/or downlink data 206 including one or more data channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and data information may be organized by subdividing a carrier, in time, into suitable transmission time intervals (TTIs).

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the TTI for uplink packet transmissions.

Uplink and downlink transmissions may generally utilize a suitable error correcting block code. In a typical block code, an information message or sequence is split up into blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may include a source transmit signal (STS), a direction selection signal (DSS), a destination receive signal (DRS), and a physical sidelink HARQ indicator channel (PSHICH). The STS/DSS may provide for a scheduled entity 204 to request a duration of time to keep a sidelink channel available for a sidelink signal; and the DRS may provide for the scheduled entity 204 to indicate the availability of the sidelink channel, e.g., for a requested duration of time. An exchange of DSS/STS and DRS signals (e.g., handshake) may enable different scheduled entities performing sidelink communications to negotiate the availability of the sidelink channel prior to communication of the sidelink traffic information 214. The PSHICH may include HARQ acknowledgment information and/or a HARQ indicator from a destination device, so that the destination may acknowledge data received from a source device.

The PSHICH may be a channel of the sidelink-centric subframe dedicated to sidelink feedback. For example, the sidelink-centric subframe may include an uplink burst channel; however the uplink burst channel may be for power control for an eNodeB, and may not be considered to be a channel of the sidelink-centric subframe dedicated to sidelink feedback. The PSHICH may be separate from the uplink burst channel; the PSHICH may be considered as a channel of the sidelink-centric subframe dedicated to sidelink feedback.

In some examples, scheduled entities such as a first scheduled entity 204a and a second scheduled entity 204b may transmit UL reference signals to the scheduling entity 202 for estimating UL channel quality. Some examples of UL references signals are the UL sounding reference signal (SRS) and demodulation reference signals (DMRS). These reference signals may allow the scheduling entity 202 to make decisions for UL resource allocation, link adaptation, and to decode UL data from the scheduled entity. In some examples, the UL SRS may be transmitted by the scheduled entity 204 on one or more symbols (e.g., last symbol) of a subframe. The scheduling entity 202 may use the UL SRS to determine the channel quality and assign UL resources to the scheduled entity 204 based on the channel quality. The scheduling entity 202 may use the UL DMRS for channel estimation and for coherent demodulation. In some examples, the scheduled entity 204 may transmit the DMRS on a physical uplink shared channel (PUSCH) or a physical uplink control channel (PUCCH).

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other data, control, and feedback channels.

Scheduling Entity

Figure 3:
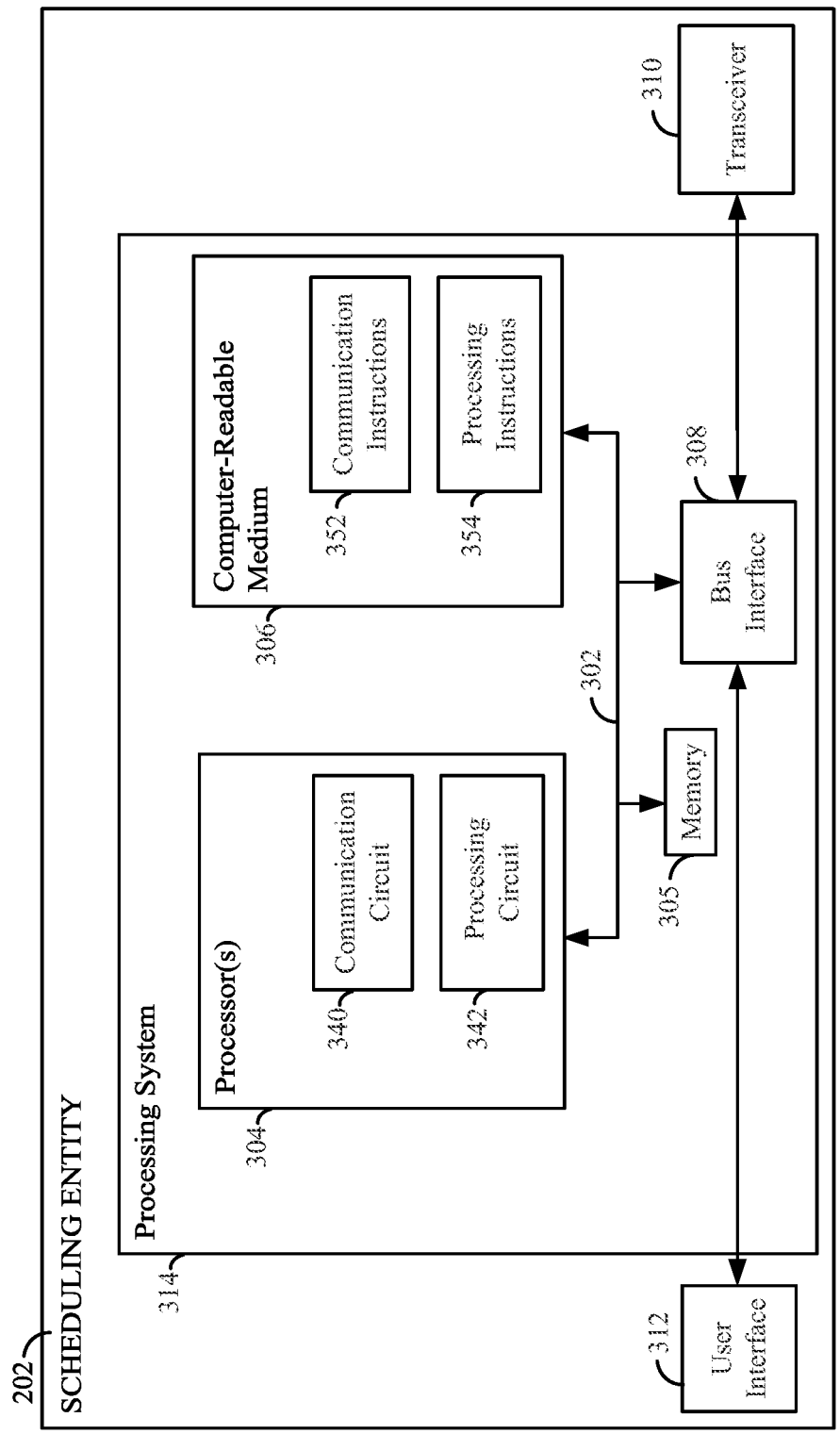
FIG. 3 is a diagram illustrating an example of a hardware implementation for a scheduling entity according to some aspects of the present disclosure.

FIG. 3 is a diagram 300 illustrating an example of a hardware implementation for a scheduling entity 202 according to aspects of the present disclosure. The scheduling entity 202 may employ a processing system 314. For example, the scheduling entity 202 may be a user equipment (UE) as illustrated in any one or more of FIGS. 1, 2, 7, 9, and/or 12. In another example, the scheduling entity 202 may be a base station as illustrated in FIG. 1.

The scheduling entity 202 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, scheduling entity 202 may be configured to perform any one or more of the functions described herein. That is, the processor 304, as utilized in scheduling entity 202, may be used or configured to implement any one or more of the processes described herein, for example, in FIGS. 7-19.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits. A bus interface 308 provides an interface between the bus 302 and a transceiver 310. The transceiver 310 provides a communication interface or a means for communicating with various other apparatuses over a transmission medium. Depending upon the nature of the apparatus, a user interface 312 (e.g., keypad, display, speaker, microphone, joystick) may also be provided.

At least one processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software. In some aspects of the disclosure, the computer-readable medium 306 may include communication instructions 352. The communication instructions 352 may include instructions for performing various operations related to wireless communication (e.g., signal reception and/or signal transmission) as described herein. For example, the communication instructions 352 may include code for configuring the processing system 314 and communication interface 310 to communicate and control a plurality of scheduled entities using sidelink communication. In some aspects of the disclosure, the computer-readable medium 306 may include processing instructions 354. The processing instructions 354 may include instructions for performing various operations related to signal processing (e.g., processing a received signal and/or processing a signal for transmission) as described herein. In one example, the processing instructions 354 include code that may be executed by the processor 304 to control and schedule sidelink communication as described in FIGS. 7-19.

At least one processor 304 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, at least one processor 304 may include a communication circuit 340. The communication circuit 340 may include one or more hardware components that provide the physical structure that performs various processes related to wireless communication (e.g., signal reception and/or signal transmission) as described herein. For example, the communication circuit 340 may be configured to control and schedule sidelink communication among a plurality of scheduled entities. The communication circuit 340 may transmit or broadcast sidelink grants or control information to the scheduled entities using a downlink control channel (e.g., PDCCH) via the communication interface 310. In some aspects of the disclosure, the processor 304 may also include a processing circuit 342. The processing circuit 342 may include one or more hardware components that provide the physical structure that performs various processes related to signal processing (e.g., processing a received signal and/or processing a signal for transmission) as described herein. The circuitry included in the processor 304 is provided as non-limiting examples. Other means for carrying out the described functions exists and is included within various aspects of the present disclosure. In some aspects of the disclosure, the computer-readable medium 306 may store computer-executable code comprising instructions configured to perform various processes described herein. The instructions included in the computer-readable medium 306 are provided as non-limiting examples. Other instructions configured to carry out the described functions exist and are included within various aspects of the present disclosure.

Scheduled Entity

Figure 4:
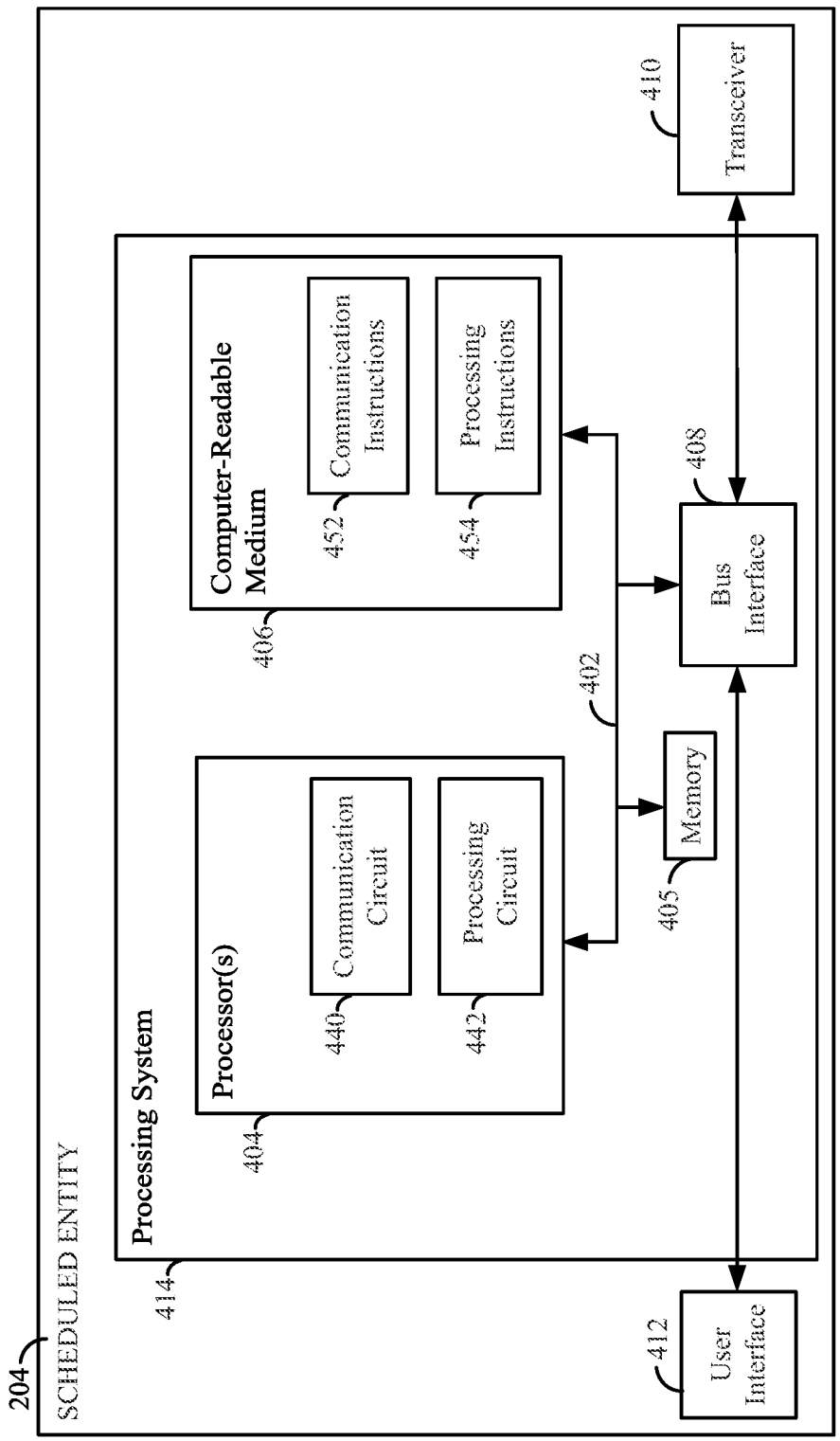
FIG. 4 is a diagram illustrating an example of a hardware implementation for a scheduled entity according to some aspects of the present disclosure.

FIG. 4 is a diagram 400 illustrating an example of a hardware implementation for a scheduled entity 204 according to aspects of the present disclosure. The scheduled entity 204 may employ a processing system 414. The scheduled entity 204 may be implemented with a processing system 414 that includes one or more processors 404. For example, the scheduled entity 204 may be a user equipment (UE) as illustrated in any one or more of FIGS. 1, 2, 7, 9, and/or 12.

Examples of processors 404 include microprocessors, microcontrollers, DSPs, FPGAs, PLDs, state machines, gated logic, discrete hardware circuits, and other suitable hardware configured to perform the various functionality described throughout this disclosure. In various examples, scheduled entity 204 may be configured to perform any one or more of the functions described herein. That is, the processor 404, as utilized in scheduled entity 204, may be used or configured to implement any one or more of the processes described herein, for example, in FIGS. 7-19.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits. A bus interface 408 provides an interface between the bus 402 and a transceiver 410. The transceiver 410 provides a communication interface or a means for communicating with various other apparatuses over a transmission medium. Depending upon the nature of the apparatus, a user interface 412 (e.g., keypad, display, speaker, microphone, joystick) may also be provided.

At least one processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software. In some aspects of the disclosure, the computer-readable medium 406 may include communication instructions 452. The communication instructions 452 may include instructions for performing various operations related to wireless communication (e.g., signal reception and/or signal transmission) as described herein. In some aspects of the disclosure, the instructions 452 may include code for configuring the scheduled entity to perform sidelink communication as described in relation to FIGS. 7-19. In some aspects of the disclosure, the computer-readable medium 406 may include processing instructions 454. The processing instructions 454 may include instructions for performing various operations related to signal processing (e.g., processing a received signal and/or processing a signal for transmission) as described herein. In some aspects of the disclosure, the processing instructions 454 may include code for configuring the scheduled entity to perform sidelink communication as described in relation to FIGS. 7-19.

At least one processor 404 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, at least one processor 404 may include a communication circuit 440. The communication circuit 440 may include one or more hardware components that provide the physical structure that performs various processes related to wireless communication (e.g., signal reception and/or signal transmission) as described herein. For example, the communication circuit 440 may be configured to perform sidelink communication as described in relation to FIGS. 7-19. In some aspects of the disclosure, the processor 404 may also include a processing circuit 442. The processing circuit 442 may include one or more hardware components that provide the physical structure that performs various processes related to signal processing (e.g., processing a received signal and/or processing a signal for transmission) as described herein. For example, the processing circuit 442 may be configured to perform sidelink communication as described in relation to FIGS. 7-19.

The circuitry included in the processor 404 is provided as non-limiting examples. Other means for carrying out the described functions exists and is included within various aspects of the present disclosure. In some aspects of the disclosure, the computer-readable medium 406 may store computer-executable code comprising instructions configured to perform various processes described herein. The instructions included in the computer-readable medium 406 are provided as non-limiting examples. Other instructions configured to carry out the described functions exist and are included within various aspects of the present disclosure.

Subframe Structure

Figure 5:
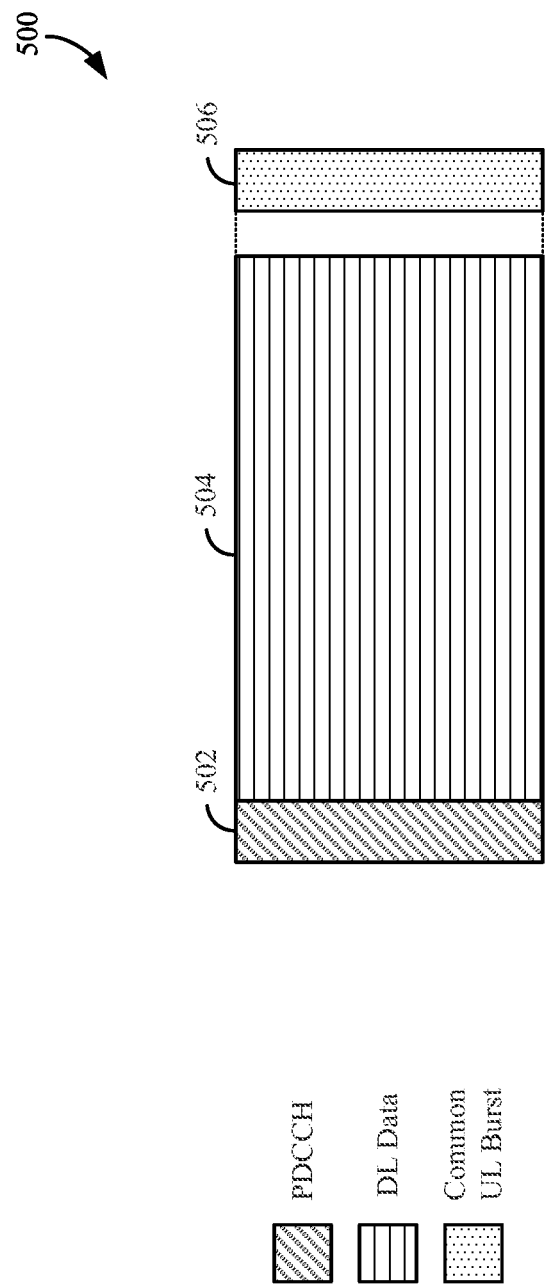
FIG. 5 is a diagram illustrating an example of a downlink (DL)-centric subframe according to some aspects of the present disclosure.

According to various aspects of the disclosure, wireless communication may be implemented by dividing transmissions, in time, into frames, wherein each frame may be further divided into subframes. These subframes may be DL-centric, UL-centric, or sidelink-centric, as described below. For example, FIG. 5 is a diagram illustrating an example of a downlink (DL)-centric subframe 500 according to some aspects of the disclosure. The DL-centric subframe is referred to as a DL-centric subframe because a majority (or, in some examples, a substantial portion) of the subframe includes DL data. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. Additional description related to the PDCCH is provided further below with reference to various other drawings. The DL-centric subframe may also include a DL data portion 504. The DL data portion 504 may sometimes be referred to as the payload of the DL-centric subframe. The DL data portion 504 may include the communication resources utilized to communicate DL data from the scheduling entity 202 (e.g., eNB) to the scheduled entity 204 (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502 and/or DL data portion 504. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information. As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the scheduled entity 204 (e.g., UE)) to UL communication (e.g., transmission by the scheduled entity 204 (e.g., UE)). One of ordinary skill in the art will understand that the foregoing is merely one example of a DL-centric subframe and alternative structures having similar features may exist without necessarily deviating from the aspects described herein.

Figure 6:
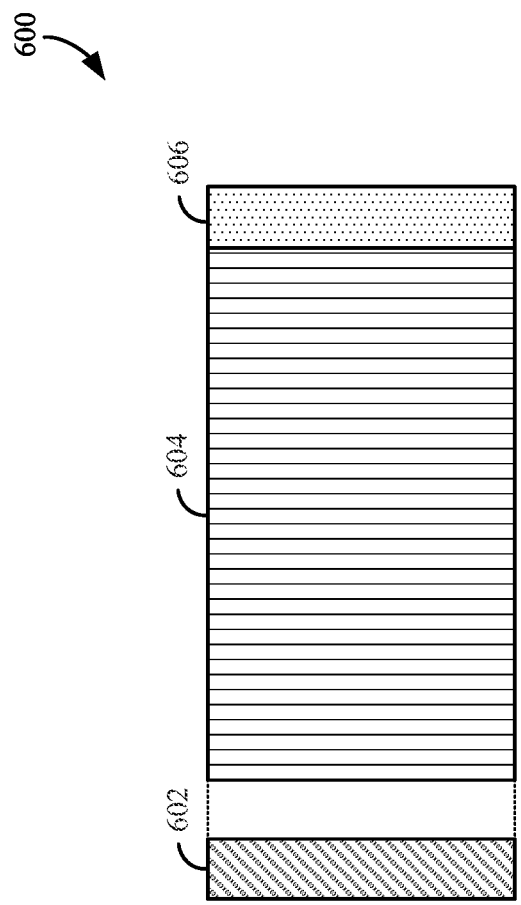
FIG. 6 is a diagram illustrating an example of an uplink (UL)-centric subframe according to some aspects of the present disclosure.

FIG. 6 is a diagram showing an example of an uplink (UL)-centric subframe 600 according to some aspects of the disclosure. The UL-centric subframe is referred to as a UL-centric subframe because a majority (or, in some examples, a substantial portion) of the subframe includes UL data. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the payload of the UL-centric subframe. The UL data portion 604 may include the communication resources utilized to communicate UL data from the scheduled entity 204 (e.g., UE) to the scheduling entity 202 (e.g., eNB). In some configurations, the control portion 602 may be a physical UL shared channel (PUSCH). As illustrated in FIG. 6, the end of the control portion 602 may be separated in time from the beginning of the UL data portion 604. This time, separation may sometimes be referred to as a gap, guard period, guard interval, and/or various other suitable terms. This separation provides time for the switch-over from DL communication (e.g., reception operation by the scheduling entity 202 (e.g., UE)) to UL communication (e.g., transmission by the scheduling entity 202 (e.g., UE)). The UL-centric subframe may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric subframe, and alternative structures having similar features may exist without necessarily deviating from the aspects described herein.

Sidelink

In some circumstances, two or more scheduled entities 204 (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one scheduled entity 204 (e.g., $UE_1$) to another scheduled entity 204 (e.g., $UE_2$) without relaying that communication through the scheduling entity 202 (e.g., eNB), even though the scheduling entity 202 (e.g., eNB) may be utilized for scheduling and/or control purposes. In some examples, the sidelink signals may be communicated using licensed spectrum (unlike wireless local area networks, which typically use an unlicensed spectrum).

However, communication using sidelink signals may increase the relative likelihood of signal interference in certain circumstances. For example, without the aspects described in the present disclosure, interference may occur between the sidelink signals and the DL/UL control/scheduling information of nominal traffic. That is, the DL/UL control/scheduling information of nominal traffic may not be as well protected. As another example, without the aspects described in the present disclosure, interference may occur between sidelink signals originating from different scheduled entities 204 (e.g., UEs). That is, concurrently transmitted sidelink signals may collide and/or interfere with each other. Aspects of the present disclosure provide for an interference management scheme for concurrent sidelink signals and sidelink-centric subframes that enable sidelink interference management. As exemplified herein, DL-centric and UL-centric subframes may refer to subframes that include DL or UL data portions, respectively. In some aspects, in a DL-centric subframe, a majority (or at least a substantial portion in comparison to other individual portions) of the subframe includes a DL data portion. In some aspects, in a UL-centric subframe, a majority (or at least a substantial portion in comparison to other individual portions) of the subframe includes a UL data portion. A sidelink-centric subframe may be described in a similar manner. As exemplified herein, a sidelink-centric subframe may refer to a subframe that includes a sidelink data portion. In some aspects, in a sidelink-centric subframe, a majority (or at least a substantial portion in comparison to other individual portions) of the subframe includes a sidelink data portion. In an example where the sidelink-centric subframe is utilized for broadcast communications, the sidelink data portion may carry a physical sidelink broadcast channel (PSBCH) (formerly a physical sidelink shared channel (PSSCH)).

Broadcast Sidelink Subframe

Figure 7:
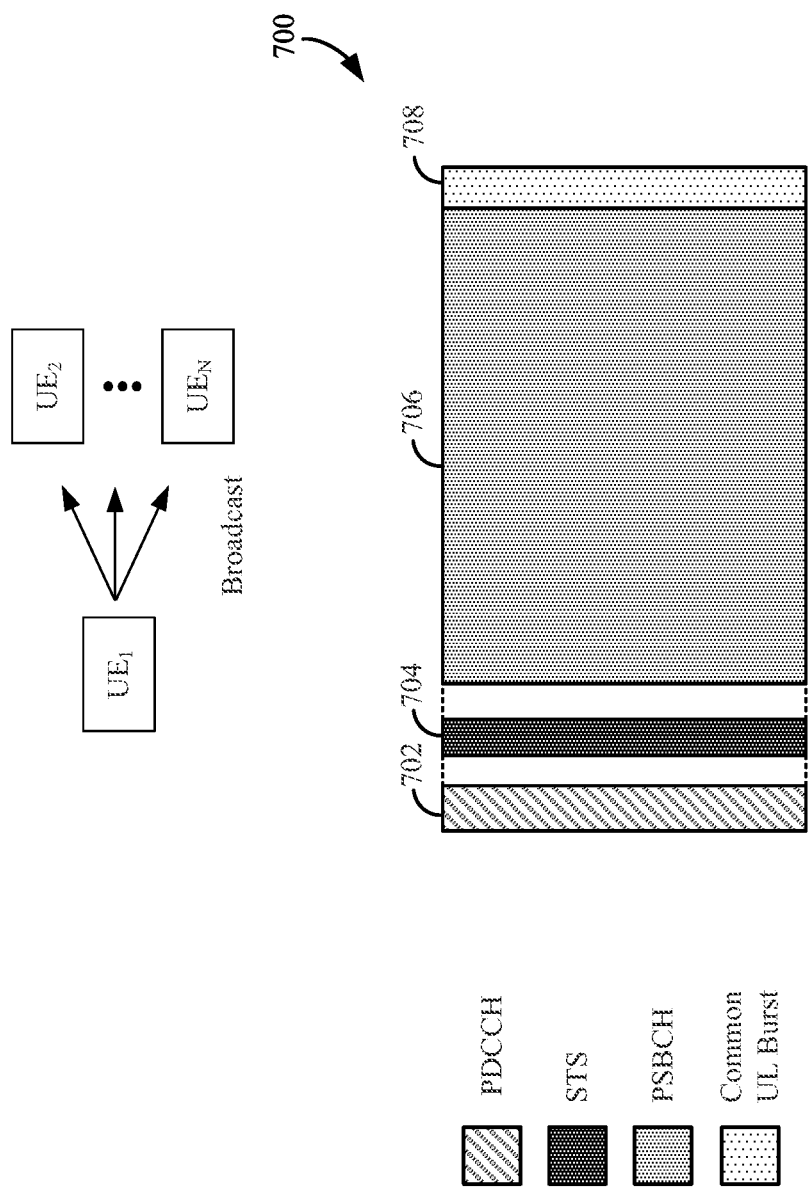
FIG. 7 is a diagram illustrating an example of a sidelink-centric subframe according to some aspects of the present disclosure.

FIG. 7 is a diagram illustrating an example of a sidelink-centric subframe 700 according to some aspects of the present disclosure. In some configurations, this sidelink-centric subframe may be utilized for broadcast communication. A broadcast communication may refer to a point-to-multipoint transmission by one scheduled entity 204 (e.g., $UE_1$) to a set of one or more scheduled entities 204 (e.g., $UE_2$-$UE_N$). In this example, the sidelink-centric subframe includes a control portion 702, which may be a PDCCH. In some aspects, the control portion 702 may be similar to the control portion 502 (e.g., PDCCH) described in greater detail above with reference to FIG. 5. Additionally or alternatively, the control portion 702 may include grant information related to the sidelink signal or sidelink communication. Non-limiting examples of grant information may include generic grant information and link-specific grant information. Link-specific grant information may refer to information that enables a specific sidelink communication to occur between two particular scheduled entities 204 (e.g., UEs). In comparison, generic grant information may refer to information that generally enables sidelink communications to occur within a particular cell, without specifying a particular sidelink communication.

Notably, as illustrated in FIG. 7, the control portion 702 may be included in the beginning or initial portion of the sidelink-centric subframe. By including the control portion 702 in the beginning or initial portion of the sidelink-centric subframe, the likelihood of interfering with the control portions 502, 602 of DL-centric and UL-centric subframes of nominal traffic can be reduced or minimized. In other words, because the DL-centric subframe, the UL-centric subframe, and the sidelink-centric subframe have their DL control information communicated during a common portion of their respective subframes, the likelihood of interference between the DL control information and the sidelink signals can be reduced or minimized. That is, the control portions 502, 602 of DL-centric and UL-centric subframes (of nominal traffic) are relatively better protected.

The sidelink-centric subframe 700 may also include a source transmit signal (STS) 704 portion (formerly referred to as, or similar to a, request-to-send (RTS) portion). The STS 704 portion may refer to a portion of the subframe during which one scheduled entity 204 (e.g., a UE utilizing a sidelink signal) communicates a request signal (i.e., an STS signal) indicating a requested duration of time to keep a sidelink channel available for a sidelink signal. One of ordinary skill in the art will understand that the STS signal may include various additional or alternative information without necessarily deviating from the scope of the present disclosure. In some configurations, the STS signal may include a group destination identifier (ID). The group destination ID may correspond to a group of devices that are intended to receive the STS signal. In some configurations, the STS signal may indicate a duration of the sidelink transmission, and/or may include a reference signal (RS) to enable channel estimation and RX-yielding (described below), a modulation and coding scheme (MCS) indicator, and/or various other information. In some examples, the STS RS may be transmitted at a higher (e.g., boosted) power level to provide additional protection of the broadcast. Further, the STS MCS indicator may be utilized to inform the receiving device of the MCS utilized for transmissions in the sidelink data portion 706. Here, the reference signal (RS) may take any suitable form or structure on the channel that may be useful for interference management (e.g., by creating a predictable amount of interference) and channel management at the receiver. In some configurations, the STS signal (or, in other examples, the DRS signal) may include a release flag, configured to explicitly signal that the transmitting device is releasing sidelink resources that may have previously been requested by the transmitting device, or in other words, sending an explicit release signal to indicate that a sidelink device is releasing a sidelink resource. Therefore, the release flag may be set in explicit sidelink signaling (e.g., STS/DRS signaling) to indicate that a sidelink device is releasing a sidelink resource so that other users, which may have been backing off, can get back into trying to access or use the sidelink resources that were previously unavailable.

For the sake of completeness, the following information is provided regarding RX-yielding. Assume that two sidelinks exist. Sidelink$_1$ is between $UE_A$ and $UE_B$, and Sidelink$_2$ is between $UE_C$ and $UE_D$. Assume also that Sidelink$_1$ has a higher priority than Sidelink$_2$. If $UE_A$ and $UE_C$ concurrently transmit STS signals, $UE_D$ will refrain from transmitting a DRS signal, because Sidelink$_1$ has a higher priority than Sidelink$_2$. Accordingly, the relatively lower priority sidelink (Sidelink$_2$) yields communication of the DRS signal under these circumstances.

A first scheduled entity 204 (e.g., $UE_1$) may transmit an STS signal to one or more other scheduled entities 204 (e.g., $UE_2$, $UE_3$) to request that the other scheduled entities 204 (e.g., $UE_2$, $UE_3$) refrain from using the sidelink channel for the requested duration of time, thereby leaving the sidelink channel available for first scheduled entity 204 (e.g., $UE_1$). By transmitting the STS signal, the first scheduled entity 204 (e.g., $UE_1$) can effectively reserve the sidelink channel for a sidelink signal. This enables distributed scheduling and management of interference that might otherwise occur from another sidelink communication from other scheduled entities 204 (e.g., $UE_2$, $UE_3$). Put another way, because the other scheduled entities 204 (e.g., $UE_2$, $UE_3$) are informed that the first scheduled entity 204 (e.g., $UE_1$) will be transmitting for the requested period of time, the likelihood of interference between sidelink signals is reduced.

The sidelink-centric subframe 700 may also include a sidelink data portion 706. The sidelink data portion 706 may sometimes be referred to as the payload or sidelink-burst of the sidelink-centric subframe. In an example where the sidelink-centric subframe is utilized for broadcast communications, the sidelink data portion 706 may carry a physical sidelink broadcast channel (PSBCH) (formerly a physical sidelink shared channel (PSSCH)), as indicated in FIG. 7. The sidelink data portion 706 may include the communication resources utilized to communicate sidelink data from one scheduled entity 204 (e.g., $UE_1$) to one or more other scheduled entities 204 (e.g., $UE_2$, $UE_3$).

According to a further aspect of the disclosure, a broadcast sidelink-centric subframe may take on certain characteristics based on whether or not the broadcast is separated from other sidelink devices that utilize unicast sidelink-centric subframes as described above. Here, a broadcast sidelink-centric subframe utilized in the absence of unicast sidelink-centric subframe transmissions may be referred to as an orthogonalized broadcast, while a broadcast sidelink-centric subframe utilized in the presence of unicast sidelink-centric subframe transmissions may be referred to as an in-band broadcast.

The sidelink data portion 706 may be configured utilizing a suitable MCS selected according to channel conditions. In one example, the receiving device may select an MCS based on a measurement of a receive power of a reference signal in the STS 704 portion, and a measurement of interference. For example, in low receive power and/or high interference scenarios, the receiving device may select a more robust MCS, e.g., utilizing a lower modulation order and/or a lower coding rate.

The sidelink-centric subframe 700 may also include a common UL portion 708. In some aspects, the common UL portion 708 may be similar to the common UL portion 506, 606 described above with reference to FIGS. 5-6. Notably, as illustrated in FIG. 7, the common UL portion 708 may be included in the end portion of the sidelink-centric subframe 700. By including the common UL portion 708 in the end portion of the sidelink-centric subframe, the likelihood of interfering with the common UL portion 506, 606 of DL-centric and UL-centric subframes of nominal traffic is minimized or reduced. In other words, because the DL-centric subframe, the UL-centric subframe, and the sidelink-centric subframe have their common UL portions 506, 606, 708 communicated during a similar portion of their respective subframe, the likelihood of interference between those common UL portions 506, 606, 708 is minimized or reduced. That is, the common UL portions 506, 606 of DL-centric and UL-centric subframes (of nominal traffic) are relatively better protected.

Broadcast Multi-TTI Sidelink Transmissions

Figure 8:
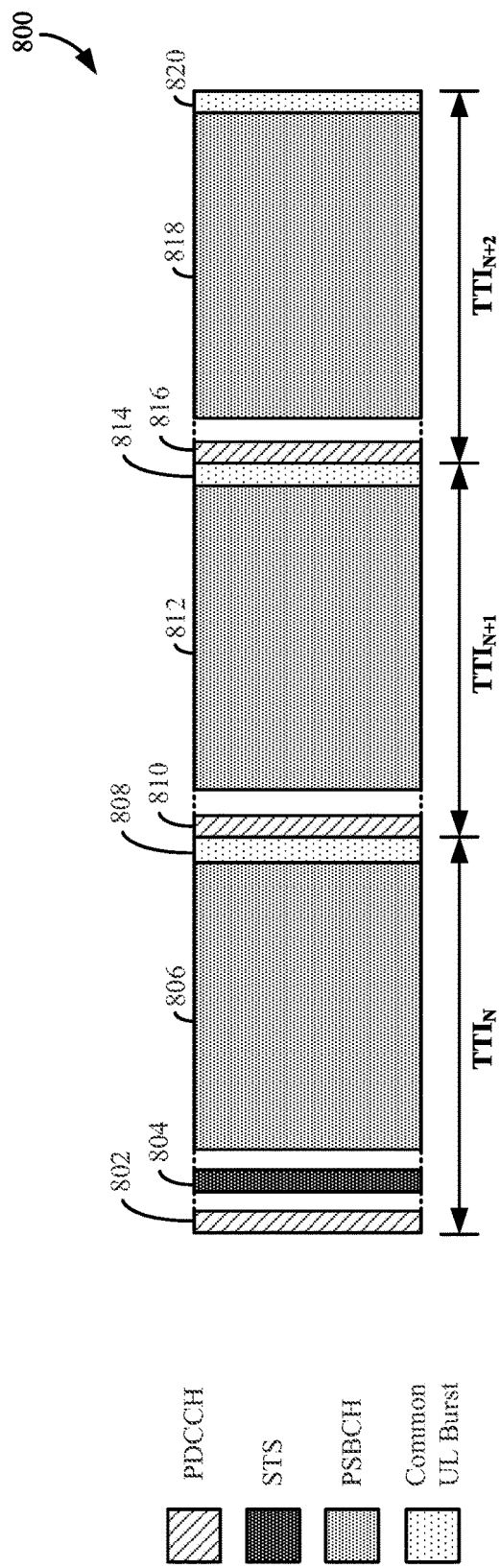
FIG. 8 is a diagram illustrating an example of sidelink-centric subframe extending across a plurality of transmission time intervals (TTIs) according to some aspects of the present disclosure.

FIG. 8 is a diagram illustrating an example of sidelink-centric subframe 800 extending across a plurality of transmission time intervals (TTIs) according to some aspects of the present disclosure. In some configurations, the sidelink-centric subframe may be utilized for broadcast communication. Generally, a TTI refers to a schedulable interval of time that contains at least one transport block. Although the example illustrated in FIG. 8 shows three TTIs (e.g., $TTI_N$, $TTI_{N+1}$, $TTI_{N+2}$), one of ordinary skill in the art will understand that any plural number of TTIs may be implemented without deviating from the scope of the present disclosure. The first TTI (e.g., $TTI_N$) may include a control portion 802 (e.g., PDCCH, as described in greater detail above) and an STS portion 804 (as also described in greater detail above). The STS portion 804 may indicate a duration that extends across more than one TTI (e.g., $TTI_N$, $TTI_{N+1}$, $TTI_{N+2}$). In other words, the STS signal may indicate a requested duration of time to keep the sidelink channel available for sidelink signals, and that requested duration may extend until the end of the last TTI (e.g., $TTI_{N+2}$) of a plurality of TTIs (e.g., $TTI_N$, $TTI_{N+1}$, $TTI_{N+2}$). Therefore, although the plurality of TTIs (e.g., $TTI_N$, $TTI_{N+1}$, $TTI_{N+2}$) each include a sidelink data portion 806, 812, 818, not every TTI requires the STS portion 804. By not including the STS portion 804 in every TTI of the plurality of TTIs (e.g., $TTI_N$, $TTI_{N+1}$, $TTI_{N+2}$), the overall amount of overhead is relatively lower than it would otherwise be (e.g., if the STS portion 804 was included in every TTI). By reducing overhead, relatively more of the TTIs (e.g., $TTI_{N+1}$, $TTI_{N+2}$) lacking the STS portion 804 can be utilized for communication of the sidelink data portion 812, 818, which thereby increases relative throughput.

Within the first TTI (e.g., $TTI_N$), the STS portion 804 may be followed by a sidelink data portion 806 (which is described in greater detail above with reference to the sidelink data portion 706 in FIG. 7). The sidelink data portion 806 may be followed by the common UL portion 808 (which is described in greater detail above with reference to the common UL portion 708 in FIG. 7). In the example illustrated in FIG. 8, every TTI (e.g., $TTI_{N+1}$, $TTI_{N+2}$) following the first TTI (e.g., $TTI_N$) includes a control portion 810, 816 at an initial/beginning portion of each TTI and a common UL portion 814, 820 at the end portion of each TTI. By providing the control portion 810, 816 at the initial/beginning of each TTI and providing the common UL portion 814, 820 at the end portion of each TTI, the sidelink-centric subframes have a structure that minimizes the likelihood of interference with DL/UL control/scheduling information of nominal traffic (as described in greater detail above).

The example in FIG. 8 has been described as a single sidelink-centric subframe 800 including a plurality of TTIs. However, it is to be understood that the definition of subframe within the present disclosure is intended to be broad, and not limiting as to the duration of the sidelink-centric subframe 800. That is, in some technologies, a subframe may always have a duration of a single TTI. Those of ordinary skill in the art will recognize that this only presents a difference in terminology, and aspects of the present disclosure may apply therein. For example, referring to FIG. 8, it may alternatively be understood that the first TTI (e.g., $TTI_N$) corresponds to a first subframe, and each of the following TTIs (e.g., $TTI_{N+1}$-$TTI_{N+2}$) correspond to subsequent subframes. In this example, the STS portion 804 within the first TTI (e.g., $TTI_N$) or first subframe may reserve the sidelink channel over a plurality of subframes in the same way as described above.

Unicast Sidelink Subframe

Figure 9:
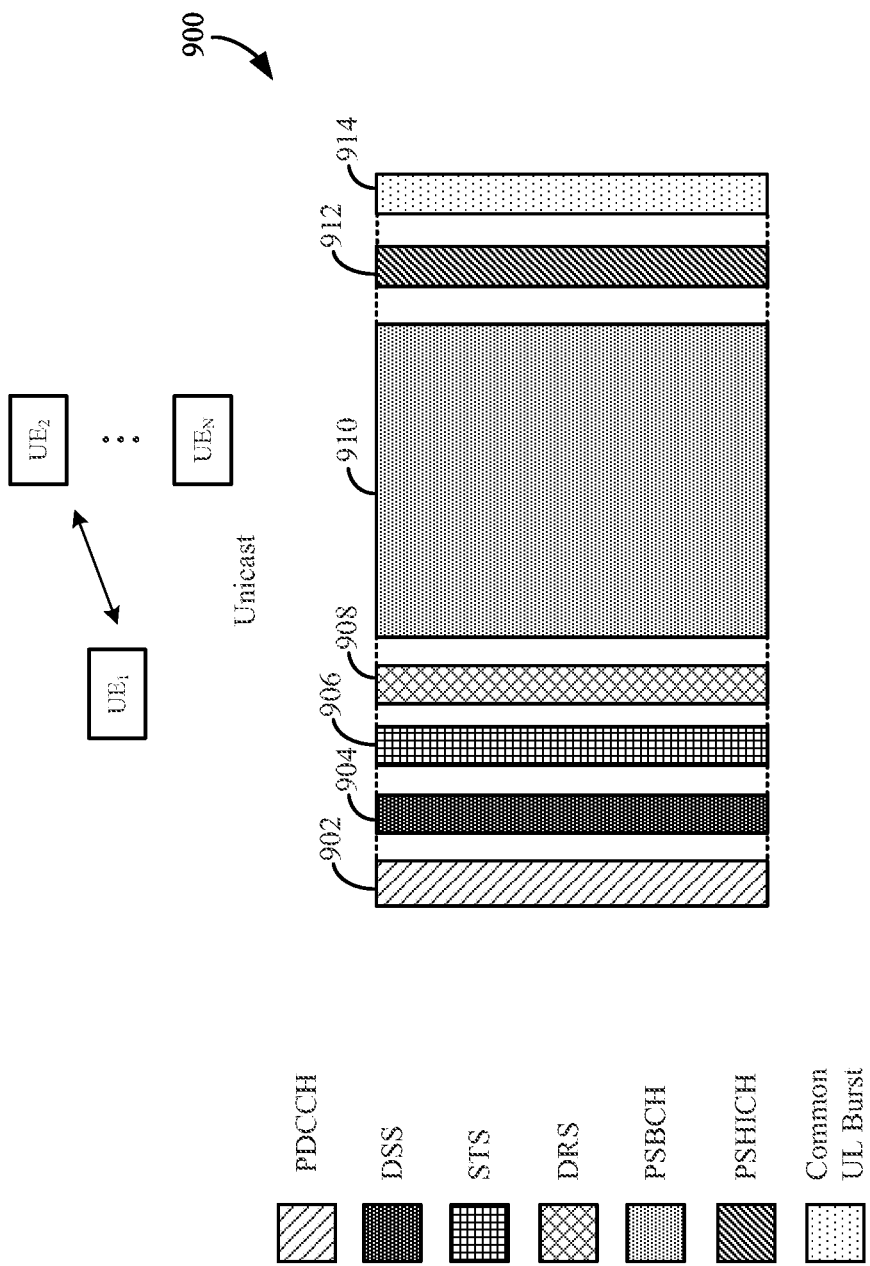
FIG. 9 is a diagram illustrating another example of a sidelink-centric subframe according to some aspects of the present disclosure.

FIG. 9 is a diagram illustrating another example of a sidelink-centric subframe 900 according to some aspects of the present disclosure. In some configurations, this sidelink-centric subframe, or a subframe having similar structure, may be utilized for a unicast communication. A unicast communication may refer to a point-to-point transmission by a scheduled entity 204 (e.g., $UE_1$) to a particular scheduled entity 204 (e.g., $UE_2$).

In each of the sidelink-centric subframes that follow, as described below, for a given device, certain fields or portions of the subframe may correspond to transmissions from that device or reception at that device, depending on whether that given device is transmitting sidelink traffic or receiving sidelink traffic. As illustrated in each of FIGS. 7-13, a time gap (e.g., guard interval, guard period, etc.) between adjacent data portions, if any, may enable a device to transition from a listening/receiving state (e.g., during direction selection signal (DSS) 904 for a non-primary device) to a transmitting state (e.g., during STS 906 for a non-primary device); and/or to transition from a transmitting state (e.g., during STS 906 for a non-primary device) to a listening/receiving state (e.g., during DRS 908 for either a primary or non-primary transmitting device). The duration of such a time gap or guard interval may take any suitable value, and it should be understood that the illustrations in FIGS. 7-13 are not to scale with respect to time. Many such time gaps are illustrated in the various illustrations to represent some aspects of particular embodiments, but it should be understood that the illustrated time gaps may be wider or narrower than they appear, and in some examples, an illustrated time gap may not be utilized, while in other examples, the lack of a time gap might be replaced with a suitable time gap between regions of a subframe. In some aspects of the disclosure, a particular subframe may be structured with time gaps corresponding to TX-RX transitions as well as RX-TX transitions, in order that the same subframe structure may accommodate the operation of a given device both when that device is transmitting sidelink traffic, and when that device is receiving sidelink traffic.

In the example illustrated in FIG. 9, the sidelink-centric subframe includes a control portion 902, which may be a physical downlink control channel (PDCCH). In some aspects, the control portion 902 may be a common DL portion configured the same as or similar to the control portion 502 (e.g., PDCCH) described in greater detail above with reference to FIG. 5. Additionally or alternatively, the control portion 902 may include grant information related to the sidelink signal or sidelink communication. Non-limiting examples of grant information may include generic grant information and link-specific grant information. Link-specific grant information may refer to information that enables a specific sidelink communication to occur between two particular scheduled entities 204 (e.g., UEs). In comparison, generic grant information may refer to information that generally enables sidelink communications to occur within a particular cell, without specifying a particular sidelink communication.

Notably, as illustrated in FIG. 9, the control portion 902 may be included in the beginning or initial portion of the sidelink-centric subframe 900. By including the control portion 902 in the beginning or initial portion of the sidelink-centric subframe 900, the likelihood of interfering with the control portions 502, 602 of DL-centric and UL-centric subframes of nominal traffic is minimized. In other words, because the DL-centric subframe 500, the UL-centric subframe 600, and the sidelink-centric subframe 900 have their DL control information communicated during a common portion of their respective subframes, the likelihood of interference between the DL control information and the sidelink signals is minimized. That is, the control portions 502, 602 of DL-centric and UL-centric subframes (of nominal traffic) are relatively better protected.

The sidelink-centric subframe 900 may further include a primary request signal such as a direction selection signal (DSS) 904, and a secondary request signal such as a source transmit signal (STS) 906. In various examples, the content of the DSS and the STS may take different formats. As one example, the DSS 904 may be utilized for direction selection and the STS 906 may be utilized as a request signal. Here, direction selection refers to the selection whether a primary sidelink device transmits a request signal in the STS, or whether a primary sidelink device receives a request signal (i.e., a non-primary or secondary sidelink device transmits a request signal in the STS). In this example, the DSS may include a destination ID (e.g., corresponding to a non-primary or secondary sidelink device) and a direction indication. In this manner, a listening sidelink device that receives the DSS transmission and is not the device corresponding to the destination ID need not necessarily be active and monitoring for the STS transmission. In this example, the STS may include an indication of a requested duration of time to reserve a sidelink channel for sidelink data. Accordingly, with the STS/DSS portions of the sidelink-centric subframe 900, a request for reservation of the sidelink channel in a desired direction between a primary and a non-primary sidelink device may be established.

In another example, content of the DSS 904 and the STS 906 may be substantially similar to one another, although the DSS 904 may be utilized by a primary sidelink device and the STS 906 may be utilized by a secondary sidelink device. The DSS and/or STS may be utilized by a scheduled entity 204 (e.g., UE) as a request signal to indicate a requested duration of time to keep a sidelink channel available for a sidelink signal. One of ordinary skill in the art will understand that the DSS and/or STS may include various additional or alternative information without necessarily deviating from the scope of the present disclosure. In some configurations, the DSS and/or STS may include a destination identifier (ID). The destination ID may correspond to a specific apparatus intended to receive the STS/DSS (e.g., UE2). In some configurations, the DSS and/or STS may indicate a duration of the sidelink transmission, and/or may include a reference signal to enable channel estimation and RX-yielding (described above), a modulation and coding scheme (MCS) indicator, and/or various other information. Here, the MCS indicator may be utilized to inform the receiving device of the MCS utilized for transmissions in the data portion.

A primary device may transmit a primary request signal (e.g., a DSS) during a primary request portion of a subframe (e.g., DSS 904), and a non-primary device (e.g., a secondary device) may transmit a secondary request signal (e.g., an STS) during a secondary request portion of the subframe (e.g., STS 906 portion). A primary device may refer to a device (e.g., a UE or scheduled entity 204) that has priority access to the sidelink channel. During an association phase, one device may be selected as the primary device and another device may be selected as the non-primary (e.g., secondary) device. In some configurations, the primary device may be a relay device that relays a signal from a non-relay device to another device, such as a scheduling entity 202 (e.g., base station). The relay device may experience relatively less path loss (when communicating with the scheduling entity 202 (e.g., base station)) relative to the path loss experienced by the non-relay device.

During the DSS 904 portion, the primary device transmits a DSS, and the non-primary device listens for the DSS from a primary device. On the one hand, if the non-primary device detects a DSS during the DSS 904 portion, then the non-primary device will not transmit an STS during the STS 906 portion. On the other hand, if the non-primary device does not detect a DSS during the DSS 904 portion, then the non-primary device may transmit an STS during the STS 906 portion.

If the sidelink channel is available for the requested duration of time, an apparatus identified or addressed by the destination ID in the STS/DSS, which receives the STS/DSS, may communicate a destination receive signal (DRS) during the DRS 908 portion. The DRS may indicate availability of the sidelink channel for the requested duration of time. The DRS may additionally or alternatively include other information, such as a source ID, a duration of the transmission, a signal to interference plus noise ratio (SINR) (e.g., of the received RS from the source device), an RS to enable TX-yielding, CQI information, and/or various other suitable types of information. The exchange of STS/DSS and DRS enable the scheduled entities 204 (e.g., UEs) performing the sidelink communications to negotiate the availability of the sidelink channel prior to the communication of the sidelink signal, thereby minimizing the likelihood of interfering sidelink signals. In other words, without the STS/DSS and DRS, two or more scheduled entities 204 (e.g., UEs) might concurrently transmit sidelink signals using the same resources of the sidelink data portion 910, thereby causing a collision and resulting in avoidable retransmissions.

For the sake of completeness, the following information is provided regarding TX-yielding. Assume (again) that two sidelinks exist. Sidelink1 is between $UE_A$ and $UE_B$, and Sidelink2 is between $UE_C$ and $UE_D$. Assume (again) that Sidelink1 has a higher priority than Sidelink2. If $UE_A$ and $UE_C$ concurrently transmit STS signals, $UE_B$ will transmit a DRS signal (because Sidelink1 has relatively higher priority than Sidelink2). In the DRS signal, $UE_B$ will include an RS that is configured to inform $UE_C$ that it will interfere with the sidelink communication (e.g., sidelink signal in the sidelink data portion 910) if it transmits during a particular period of time. Accordingly, by receiving this RS, $UE_C$ will refrain from transmitting for that particular period of time (e.g., at least for the duration of the sidelink communication of Sidelink1). Accordingly, the relatively lower priority sidelink (Sidelink2) yields communication for a particular period of time under these circumstances.

The sidelink-centric subframe may also include a sidelink data portion 910. The sidelink data portion 910 may sometimes be referred to as the payload or sidelink-burst of the sidelink-centric subframe. In an example where the sidelink-centric subframe is utilized for unicast transmissions, the sidelink data portion 910 may carry a physical sidelink shared channel (PSSCH). The sidelink data portion 910 may include the communication resources utilized to communicate sidelink data from one scheduled entity 204 (e.g., $UE_1$) to a second scheduled entity 204 (e.g., $UE_2$). In some configurations, the MCS of the sidelink signal communicated in the sidelink data portion 910 may be selected based on the CQI feedback included in the DRS 908.

The sidelink-centric subframe may also include a sidelink acknowledgment portion 912. In some aspects the sidelink acknowledgment portion 912 may carry a physical sidelink HARQ indicator channel (PSHICH). After communicating the sidelink signal in the sidelink data portion 910, acknowledgment information may be communicated between the scheduled entities 204 (e.g., UEs) utilizing the sidelink acknowledgment portion 912. Non-limiting examples of such acknowledgment information may include an ACK signal, a NACK signal, a HARQ indicator, and/or various other suitable types of acknowledgment information. For example, after receiving and successfully decoding a sidelink signal from $UE_1$ in the sidelink data portion 910, $UE_2$ may transmit an ACK signal to the $UE_1$ in the sidelink acknowledgment portion 912 of the sidelink-centric subframe.

The sidelink-centric subframe may also include a common UL portion 914. In some aspects, the common UL portion 914 may be a common UL burst or an UL portion, and may be configured the same as or similar to the common UL portion 506, 606 described above with reference to FIGS. 5-6. Notably, as illustrated in the example of FIG. 9, the common UL portion 914 may be included in the end portion of the sidelink-centric subframe. By including the common UL portion 914 in the end portion of the sidelink-centric subframe, the likelihood of interfering with the common UL portion 506, 606 of DL-centric and UL-centric subframes of nominal traffic is minimized. In other words, because the DL-centric subframe, the UL-centric subframe, and the sidelink-centric subframe have their common UL portion 506, 606, 914 communicated during the same or similar portion of their respective subframe, the likelihood of interference between those common UL portions 506, 606, 914 is reduced. That is, the common UL portions 506, 606 of DL-centric and UL-centric subframes (of nominal traffic) are relatively better protected.

Unicast Multi-TTI Sidelink Transmissions

Figure 10:
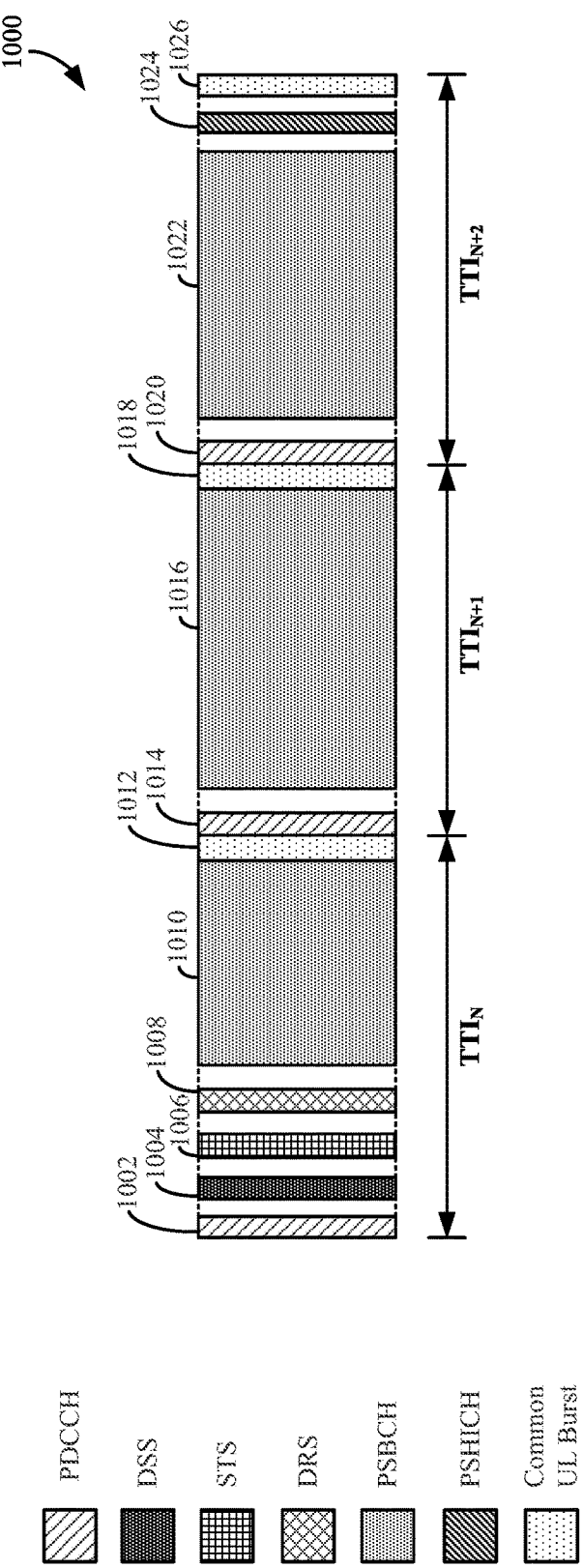
FIG. 10 is a diagram illustrating another example of a sidelink-centric subframe extending across a plurality of TTIs according to some aspects of the present disclosure.
Figure 11:
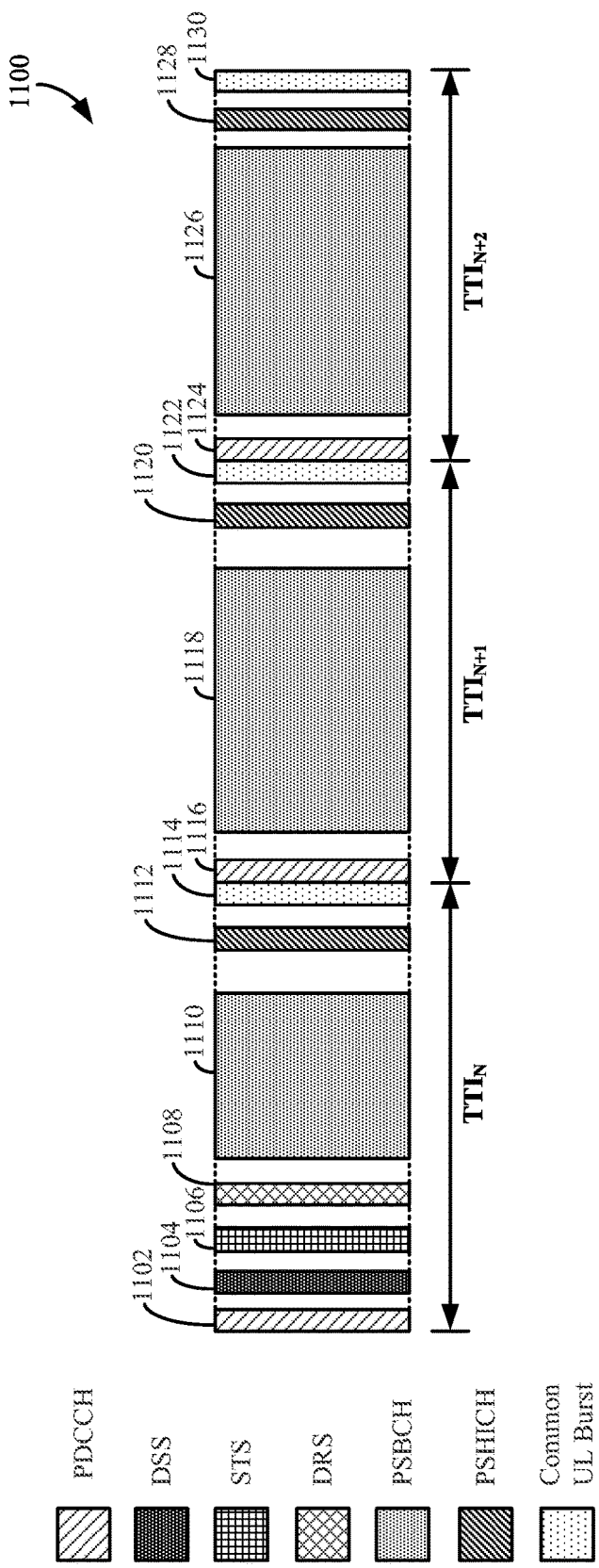
FIG. 11 is a diagram illustrating another example of a sidelink-centric subframe extending across a plurality of TTIs according to some aspects of the present disclosure.

FIGS. 10-11, described below, illustrate multi-TTI subframes according to some aspects of the disclosure. As with the example described above in relation to FIG. 9, in some configurations, the sidelink-centric subframe 1000 in FIG. 10 may be utilized for unicast communication. Although the example illustrated in FIG. 10 shows three TTIs (e.g., $TTI_N$, $TTI_{N+1}$, $TTI_{N+2}$), one of ordinary skill in the art will understand that any plural number of TTIs may be implemented within a sidelink-centric subframe as described herein without deviating from the scope of the present disclosure. In brief, FIG. 10 is a diagram illustrating another example of a sidelink-centric subframe extending across a plurality of TTIs according to some aspects of the present disclosure.

The examples described below in FIGS. 10-11 will be described as a single sidelink-centric subframe including a plurality of TTIs. However, it is to be understood that the definition of subframe within the present disclosure is intended to be broad, and not limiting as to the duration of the sidelink-centric subframe 1000 or 1100. That is, in some technologies, a subframe may always have a duration of a single TTI. Those of ordinary skill in the art will recognize that this only presents a difference in terminology, and aspects of the present disclosure may apply therein. For example, referring to either FIG. 10 or FIG. 11, it may alternatively be understood that the first TTI (e.g., $TTI_N$) corresponds to a first subframe, and each of the following TTIs (e.g., $TTI_{N+1}$-$TTI_{N+2}$) correspond to subsequent subframes. In this example, the STS/DSS-DRS handshake within the first TTI (e.g., $TTI_N$) or first subframe may reserve the sidelink channel over a plurality of subframes in the same way as described below.

Referring now specifically to FIG. 10, a diagram illustrates an example of a sidelink-centric subframe 1000 extending across a plurality of TTIs according to an aspect of the present disclosure. In some configurations, this multi-TTI sidelink-centric subframe may be utilized for unicast communications. Although the example illustrated in FIG. 10 shows three TTIs (e.g., $TTI_N$, $TTI_{N+1}$, $TTI_{N+2}$), one of ordinary skill in the art will understand that any plural number of TTIs may be implemented without deviating from the scope of the present disclosure. The first TTI (e.g., $TTI_N$) may include the control portion 1002 (e.g., PDCCH, as described in greater detail above), DSS 1004, STS 1006, and DRS 1008 (as also described in greater detail above).

In this example, the request signal communicated during DSS 1004 and/or STS 1006 may indicate a duration that extends across the plurality of TTIs (e.g., $TTI_N$, $TTI_{N+1}$, $TTI_{N+2}$). In other words, the request signal may indicate a requested duration of time to keep the sidelink channel available for sidelink signals, and that requested duration may extend until the end of the last TTI (e.g., $TTI_{N+2}$) of the plurality of TTIs (e.g., $TTI_N$, $TTI_{N+1}$, $TTI_{N+2}$). If the sidelink channel is available for that requested duration of time, then the DRS may be communicated in the DRS 1008 portion (as described in greater detail above). Although the plurality of TTIs (e.g., $TTI_N$, $TTI_{N+1}$, $TTI_{N+2}$) each include a sidelink data portion 1010, 1016, 1022, not every TTI necessarily requires DSS 1004 and/or STS 1006. By not including DSS 1004 and/or STS 1006 in every TTI of the plurality of TTIs (e.g., $TTI_N$, $TTI_{N+1}$, $TTI_{N+2}$) in the sidelink-centric subframe 1000, the overall amount of overhead is relatively lower than it would otherwise be (e.g., if DSS 1004 and/or STS 1006 were included in every TTI). By reducing overhead, relatively more of the TTIs (e.g., $TTI_{N+1}$, $TTI_{N+2}$) lacking DSS 1004 and/or STS 1006 can be utilized for communication of the sidelink data 1016, 1022, which thereby increases relative throughput.

Within the first TTI (e.g., TTIN), DSS 1004, STS 1006, and DRS 1008 may be followed by a first sidelink data portion 1010 (which is described in greater detail above with reference to the sidelink data portion 910 in FIG. 9). Each sidelink data portion 1010, 1016, 1022 may be followed by a respective common UL portion 1012, 1018, 1026 (which are described in greater detail above with reference to the common UL portion 914 in FIG. 9). In the example illustrated in FIG. 10, every TTI (e.g., $TTI_{N+1}$, $TTI_{N+2}$) following the first (e.g., $TTI_N$) includes a control portion 1014, 1020 at an initial/beginning portion of each subframe/TTI and a common UL portion 1018, 1026 at the end portion of each subframe/TTI. By providing the control portion 1014, 1020 at the initial/beginning of each subframe/TTI and providing the common UL portion 1018, 1026 at the end portion of each subframe/TTI, the sidelink-centric subframes have a structure that minimizes the likelihood of interference with DL/UL control/scheduling information of nominal traffic (as described in greater detail above).

In the example illustrated in FIG. 10, the sidelink-centric subframes include a single sidelink acknowledgment portion 1024 in a last/final TTI (e.g., $TTI_{N+2}$) of the plurality of TTIs (e.g., $TTI_N$, $TTI_{N+1}$, $TTI_{N+2}$). The acknowledgment information communicated in the sidelink acknowledgment portion 1024 in the last/final TTI (e.g., $TTI_{N+2}$) may correspond to the sidelink signals included in one or more (e.g., all) preceding sidelink data portions 1010, 1016, 1022. For example, the sidelink acknowledgment portion 1024 may include a HARQ identifier corresponding to sidelink signals communicated throughout the sidelink data portions 1010, 1016, 1022 of the plurality of TTIs (e.g., $TTI_N$, $TTI_{N+1}$, $TTI_{N+2}$) in the sidelink-centric subframe 1000. Because the sidelink acknowledgment portion 1024 is not included in every TTI (e.g., $TTI_N$, $TTI_{N+1}$), the overall amount of overhead is relatively lower than it would otherwise be (e.g., if a sidelink acknowledgment portion were included in every TTI). By reducing overhead, relatively more of the TTIs (e.g., $TTI_N$, $TTI_{N+1}$) lacking the sidelink acknowledgment portion 1024 can be utilized for communication of sidelink data, which thereby increases relative throughput. However, one of ordinary skill in the art will readily understand that the example illustrated in FIG. 10 is non-limiting and alternative configurations may exist without necessarily deviating from the scope of the present disclosure.

FIG. 11 is a diagram illustrating one example of such an alternative configuration of a sidelink-centric subframe 1100. FIG. 11 is a diagram illustrating another example of a sidelink-centric subframe extending across a plurality of TTIs according to some aspects of the present disclosure.

Various aspects illustrated in FIG. 11 (e.g., control portions 1102, 1116, 1124; DSS 1104; STS 1106; DRS 1108; and common UL portions 1114, 1122, 1130) are described above with reference to FIG. 7 and therefore will not be repeated here to avoid redundancy. An aspect in which the example illustrated in FIG. 11 may differ from the example illustrated in FIG. 10 is that the example in FIG. 11 includes a sidelink acknowledgment portion 1112, 1120, 1128 in every TTI of the plurality of TTIs (e.g., $TTI_N$, $TTI_{N+1}$, $TTI_{N+2}$). For example, each sidelink acknowledgment portion 1112, 1120, 1128 may respectively communicate acknowledgment information corresponding to a sidelink signal included in the sidelink data portion 1110, 1118, 1126 in its TTI. By receiving acknowledgment information corresponding to the sidelink signal in that particular TTI, the scheduled entity 204 (e.g., UE) may obtain relatively better specificity regarding the communication success of each sidelink signal. For example, if only one sidelink signal in a single sidelink data portion (e.g., sidelink data portion 1110) is not successfully communicated, retransmission can be limited to only the affected sidelink portion (e.g., sidelink data portion 1110) without the burden of retransmitting unaffected sidelink portions (e.g., other sidelink data portions 1118, 1126).

Improved Reliability of Multi-TTI Transmissions

The receiving device may determine the MCS for sidelink signal transmissions based on measurements of the received power of the STS reference signal for the sidelink transmitted to the receiving device, as well as interference measurements based on the STS reference signals for other links. However, these interference measurements may not be precise for a number of reasons. For example, in RX-yielding and TX-yielding of other links (described above), even though one link may have sent an STS, its intended receiving device may be blocked by a higher priority flow. Thus, that device may not send the DRS. Still, even though this device would not transmit a sidelink signal, for the interference measurement, this link would be taken into account as interference that was measured based in part on that STS transmission.

Further, the actual data transmission power in the PSSCH may be different from the transmission power of the STS reference signal, upon which the MCS selection is based.

Moreover, the amount of interference may vary from TTI to TTI. For example, links may come and go from TTI to TTI. However, as described above, by virtue of the function of the STS/DSS-DRS handshake, the MCS may be fixed for the duration of a multi-TTI sidelink transmission.

Figure 12:
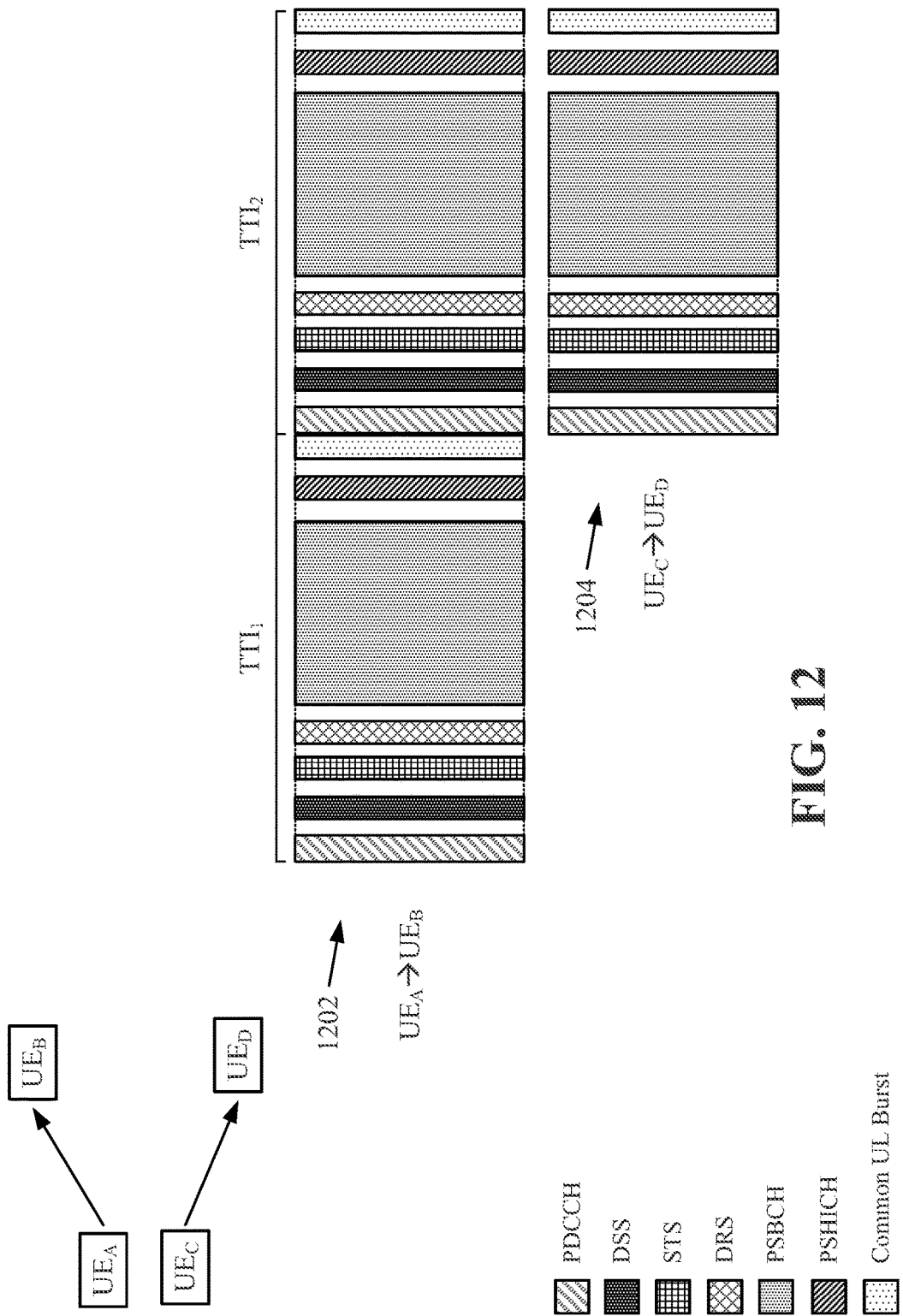
FIG. 12 is a diagram illustrating varying interference from one TTI to the next during a multi-TTI sidelink transmission according to some aspects of the present disclosure.

For example, FIG. 12 illustrates an example wherein a first sidelink signal 1202 is transmitted over two consecutive TTIs from $UE_A$ to $UE_B$. (FIG. 12 is a diagram illustrating varying interference from one TTI to the next during a multi-TTI sidelink transmission according to some aspects of the present disclosure). During the first TTI ($TTI_1$), the STS RS interference measurement may be performed, as described above, and the MCS may be established accordingly. Here, a second sidelink signal 1204 is transmitted during the second TTI ($TTI_2$), increasing the interference relative to the interference during the $TTI_1$, where the interference was measured. Because this interference is not accounted for in the MCS for the sidelink transmission from $UE_A$ to $UE_B$, the reliability of this transmission may be compromised.

Moreover, the amount of interference may vary from TTI to TTI. For example, links may come and go from one TTI to the next TTI. However, as described above, by virtue of the function of the STS/DSS-DRS handshake, the MCS may be fixed for the duration of a multi-TTI sidelink transmission. For example, FIG. 12 illustrates an example wherein a first sidelink signal 1202 is transmitted over two consecutive TTIs from $UE_A$ to $UE_B$. During the first TTI ($TTI_1$), the STS RS interference measurement may be performed as described above, and the MCS may be established accordingly. Here, a second sidelink signal 1204 is transmitted during the second TTI ($TTI_2$), increasing the interference relative to the interference during the $TTI_1$, where the interference was measured. Because this interference is not accounted for in the MCS for the sidelink transmission from $UE_A$ to $UE_B$, the reliability of this transmission may be compromised.

For scenarios such as the one illustrated here and described above, there is a desire to enable a device that communicates via sidelink signals to improve its MCS selection despite the possibility of imprecise interference measurements, as well as the ability to adapt its rate/coding from TTI-to-TTI.

Thus, according to some aspects of the present disclosure, feedback from the receiving UE to the transmitting UE during a multi-TTI sidelink transmission may be provided in each TTI (per-TTI basis), rather than on a multi-TTI basis.

That is, by virtue of the use of per-TTI feedback, adaptation to an imperfect MCS selection, and to TTI-to-TTI interference variation, may be achieved. When such per-TTI feedback is enabled, other feedback, which may also be on a per-TTI basis (e.g., as described above and illustrated in FIG. 11, with HARQ feedback provided on the PSHICH during each TTI), and which may be carried on the PSHICH, should not be compromised. However, according to a further aspect of the disclosure, the information carried on the PSHICH need not be limited to the ACK/NACK indicator alone. That is, the PSHICH may additionally include updated CQI information.

In a further aspect, the per-TTI CQI information may be based on measurements of the DMRS, e.g., within a data region, or a PSSCH, of that TTI. Still further, the per-TTI feedback on the PSHICH may also include state information about the receiver's decoder state. Based on the feedback (e.g., the per-TTI feedback on the PSHICH), the transmitter of a sidelink signal may adapt the sidelink transmission accordingly. For example, when the transmitter receives an ACK, it may perform early termination, and may send new data in remaining TTIs or, if there is no more data, may release the channel.

For example, assume a transmitter was scheduled to transmit information (e.g., a set of one or more transport blocks) over three TTIs, but the transmitter receives an ACK during the second TTI. Here, the transmitter may terminate the transmission (e.g., by performing early termination) and fill the remaining third TTI with new information (e.g., a new transport block), or alternately may release the channel such that it may be clear to send for other devices. On the other hand, when the transmitter receives a NACK and/or a receive decoder update, the transmitter may adapt the MCS as described in further detail below.

Figure 13:
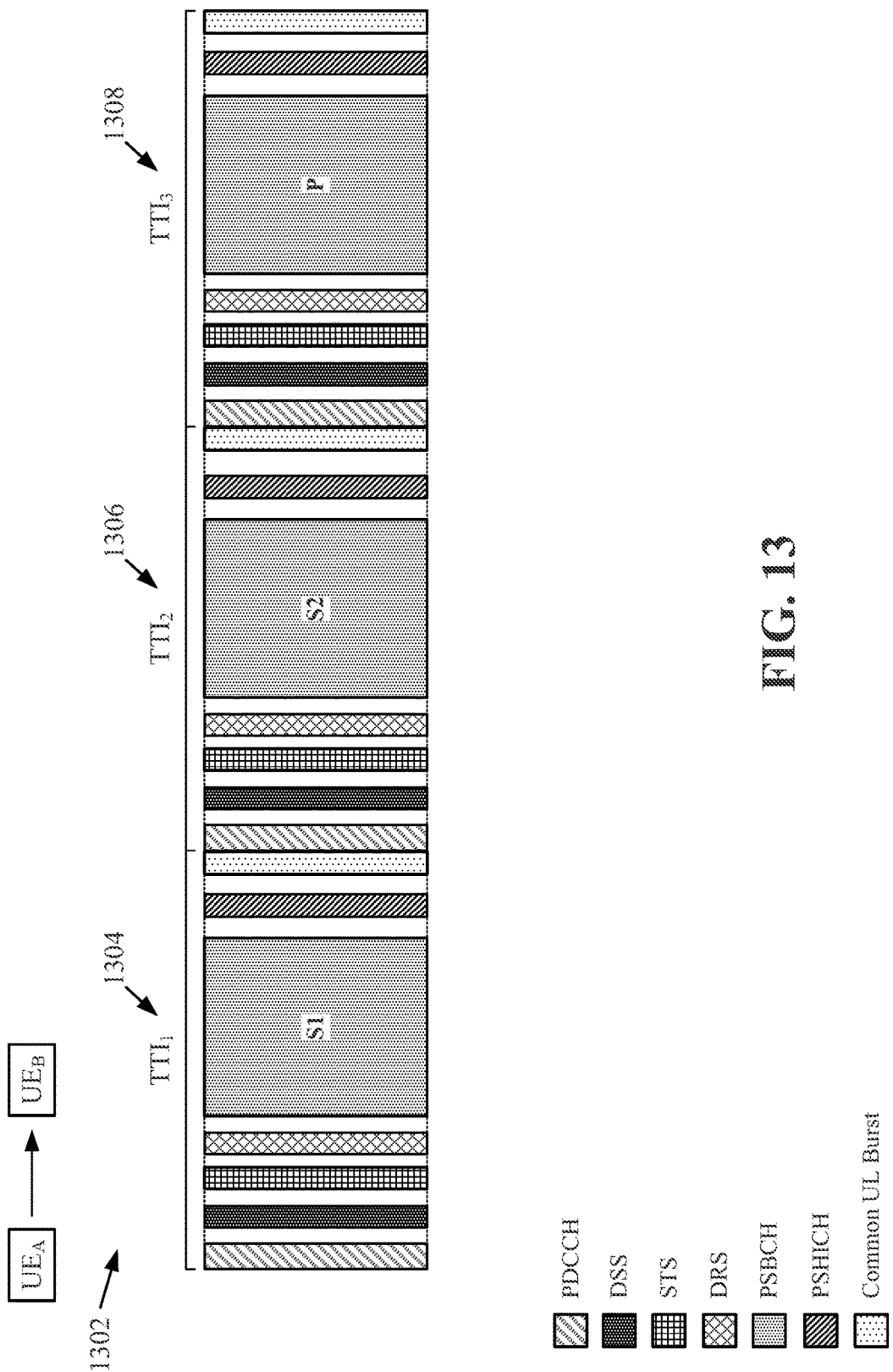
FIG. 13 is a diagram illustrating one example scenario of a multi-TTI sidelink transmission including feedback for enabling rate/coding adaptation according to some aspects of the present disclosure.

FIG. 13 is a diagram illustrating one example scenario of a multi-TTI sidelink transmission 1302 including feedback for enabling rate/coding adaptation according to some of aspects of the present disclosure. In this example, a first device ($UE_A$) has a transport block (TB) that it wishes to transmit to a second device ($UE_B$) utilizing a sidelink signal. Based on an STS/DSS-DRS handshake, it is determined that the TB will be transmitted over 3 TTIs. Here, $TTI_1$ 1304 and $TTI_2$ 1306 are illustrated as including systematic bits (the original information bits), labeled S1 and S2. $TTI_3$ 1308 has parity-check bits, labeled P. It is to be understood that this particular configuration is intended to be non-limiting in nature, and in other examples, $TTI_2$ 1304 may include some systematic bits and some parity bits; or in general, any TTI may include any suitable portion of systematic bits and/or parity bits.

If the channel turns out to be better than that for which the MCS was established, then the receiving device may attempt to perform hard decoding at the end of $TTI_2$ 1306. Here, "hard decoding" refers to decoding without the use of parity bits, which in this example, only appear in $TTI_3$ 1308. In an example where $TTI_2$ 1306 includes parity bits, full decoding may be performed. If a calculated checksum, hash code, or cyclic redundancy check (CRC) (etc.) matches, then the receiving device may transmit a HARQ ACK at the end of $TTI_2$ 1306. In response, if the transmitting device has new data to send, then the transmitting device may begin a new transport block in $TTI_3$ 1308 onwards.

If the transmitting device does not have more data, it may explicitly signal a release of the sidelink resources through an STS transmission with a release flag set. That is, a release flag may indicate that this TTI and any subsequent TTIs (if any) in the existing reservation are released.

This procedure may easily be extended to a procedure for transmitting a TB that spans more than 3 TTIs, or any suitable number of TTIs.

If the channel turns out to be worse than that for which the MCS was established during $TTI_1$ 1304 or $TTI_2$ 1306, further aspects of the disclosure provide for the transmitting device to adapt the transmission as follows. In some examples, it may be the case that the receiving device determines that the parity information P to be carried in $TTI_3$ 1308 would not be sufficient to decode the information in $TTI_1$ 1304 and $TTI_2$ 1306. That is, existing low-density parity-check (LDPC) designs operate under a constraint, wherein the receiving device requires a certain minimum fraction of "good" systematic bits in order to be capable of decoding the transport block, and no amount of additional parity bits can help decode it if this minimum is not met. If the receiving device determines that this minimum is not met, then the receiving device may transmit a NACK in $TTI_2$ 1306 to indicate to the transmitting device that the information was not received. Accordingly, the transmitting device may perform early termination, forgoing to transmit the parity bits in $TTI_3$ 1308, and may restart a fresh transport block.

In a further aspect of the present disclosure, still further refinements of the sidelink transmission are provided. For example, the receiving device may indicate certain state information at ends of $TT_1$ 1304 and $TTI_2$ 1306. Here, it may occur that the receiving device determines that S1 was suitably received but S2 was below a minimum threshold required for the receiving device to be capable of decoding. That is, the state information at the end of $TT_1$ 1304 may indicate that S1 was okay; while the state information at the end of $TTI_2$ 1306 may indicate that S2 was below the minimum threshold. Here, state information may indicate what fraction of the received systematic bits have above a greater than a minimum threshold log likelihood ratio (LLR). In another example, the actual fraction need not be included in the state information, but instead the state information may simply indicate whether greater than a suitable threshold number of the systematic bits have greater than the minimum threshold LLR. Thus, if the transmitting device receives decoder state information at the end of $TTI_2$ 1306 indicating the systematic bits S2 were received below the minimum threshold where the parity bits P would suffice for decoding, the transmitting device may shorten S2 while computing P to calculate P'. Here, shortening S2 can mean that the transmitting device assumes that all bits for S2 were zero, and the parity check bits may be re-calculated to obtain P', which only depends on S1. With P', the receiving device may be able to decode S1. In this case, the transmitting device may include S2 in a subsequent transport block.

Figure 14:
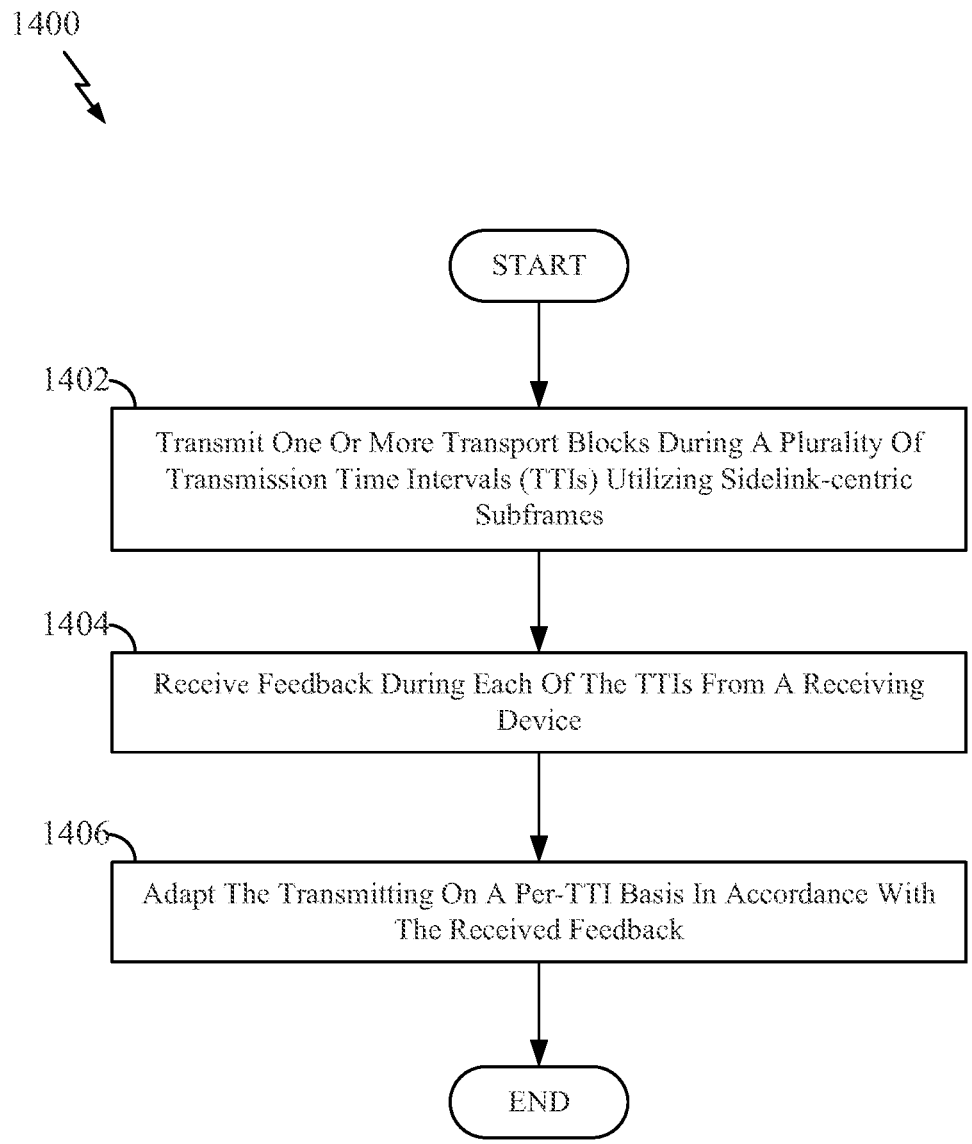
FIG. 14 is a flow chart illustrating a process for a user equipment transmitting a sidelink signal to employ rate/coding adaptation based on per-TTI feedback of a sidelink signal transmission according to some aspects of the present disclosure.

FIG. 14 is a flow chart illustrating a process 1400 for a user equipment transmitting a sidelink signal to employ rate/coding adaptation based on per-TTI feedback of a sidelink signal transmission according to some aspects of the present disclosure. The process 1400 is exemplary and not limiting. FIG. 14, as described below, some or all illustrated features may be omitted in a particular implementation within the scope of the present disclosure, and some illustrated features may not be required for implementation of all aspects of the present disclosure. In the following description, a sidelink signal transmission is discussed with reference to a transmitting device and a receiving device. It will be understood that either device may be: the user equipment 126 and/or 128 illustrated in FIG. 1; the scheduling entity 202 illustrated in FIGS. 2 and 3; and/or the scheduled entity 204 illustrated in FIGS. 2 and 4. In some examples, the process 1400 may be carried out by any suitable apparatus or means for carrying out the functions or algorithm described below.

At block 1402, the transmitting device may transmit one or more transport blocks during a plurality of transmission time intervals (TTIs) utilizing sidelink-centric subframes. In one example, the transmitting device transmits utilizing a given modulation and coding scheme (MCS). For example, the communication circuit 340 shown and described above in reference to FIG. 3, or the communication circuit 440 shown and described above in reference to FIG. 4, may transmit one or more transport blocks during a plurality of transmission time intervals (TTIs) utilizing sidelink-centric subframes and utilizing a given modulation and coding scheme (MCS).

At block 1404, the transmitting device may receive feedback during each of the TTIs from a receiving device. In one example, the feedback may include one or more of an acknowledgment/negative acknowledgment (ACK/NACK), channel quality information (CQI), or decoder state information for a decoder at the receiving device. In another example, the feedback may include an acknowledgment/negative acknowledgment (ACK/NACK) and may further include channel quality information (CQI) or decoder state information for a decoder at the receiving device. For example, the communication circuit 340 shown and described above in reference to FIG. 3, or the communication circuit 440 shown and described above in reference to FIG. 4, may receive feedback during each of the TTIs from the receiving device.

At block 1406, the transmitting device may adapt the transmitting on a per-TTI basis in accordance with the received feedback. For example, the processing circuit 342 shown and described above in reference to FIG. 3, or the processing circuit 442 shown and described above in reference to FIG. 4, may adapt the transmitting on a per-TTI basis in accordance with the received feedback.

Figure 15:
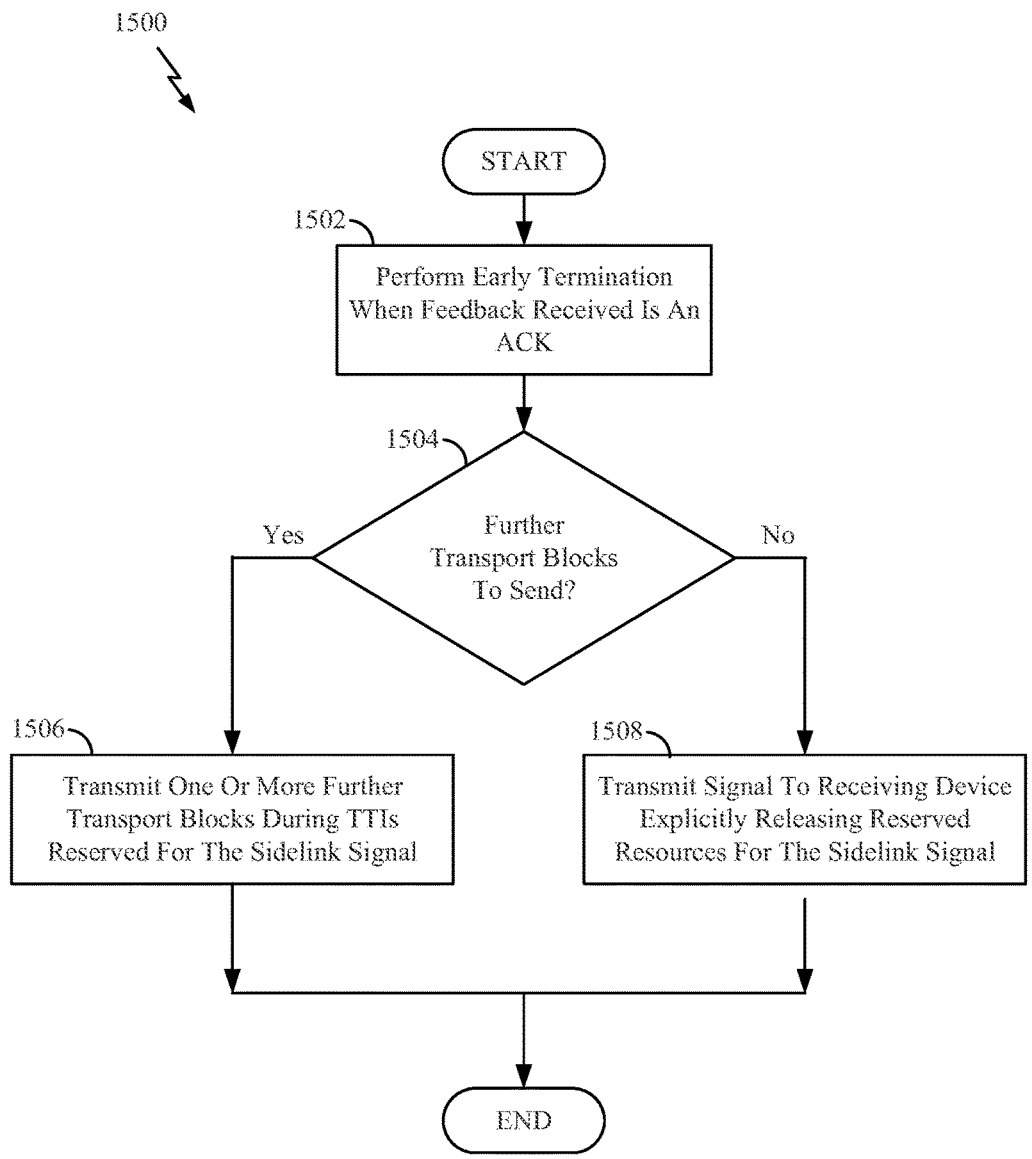
FIG. 15 is a flow chart illustrating one possible process for a transmitting device to adapt a transmission of a sidelink signal when feedback to the transmitter device comprises an ACK according to some aspects of the present disclosure.

FIG. 15 is a flow chart illustrating one possible process 1500 for a transmitting device to adapt a transmission of a sidelink signal when feedback to the transmitter device comprises an ACK according to some aspects of the present disclosure. The process 1500 is exemplary and not limiting. In FIG. 15, as described below, some or all illustrated features may be omitted in a particular implementation within the scope of the present disclosure, and some illustrated features may not be required for implementation of all aspects of the present disclosure. In the following description, a sidelink signal transmission is discussed with reference to a transmitting device and a receiving device. It will be understood that either device may be: the user equipment 126 and/or 128 illustrated in FIG. 1; the scheduling entity 202 illustrated in FIGS. 2 and 3; and/or the scheduled entity 204 illustrated in FIGS. 2 and 4. In some examples, the process 1500 may be carried out by any suitable apparatus or means for carrying out the functions or algorithm described below.

After transmitting, from a transmitting device, one or more transport blocks during a plurality of transmission time intervals (TTIs) utilizing sidelink-centric subframes and utilizing a given modulation and coding scheme (MCS), when the feedback received during a TTI from a receiving device comprises an ACK a method may include, at block 1502, performing early termination. For example, the communication circuit 340 shown and described above in reference to FIG. 3, or the communication circuit 440 shown and described above in reference to FIG. 4, may perform early termination. At block 1504 it may be determined whether the transmitting device has one or more further transport blocks to send. For example, the processing circuit 342 shown and described above in reference to FIG. 3, or the processing circuit 442 shown and described above in reference to FIG. 4, may determine whether the transmitting device has one or more further transport blocks to send. At block 1506, if it is determined that the transmitting device has one or more further transport blocks to send, then the method may include transmitting the one or more further transport blocks during TTIs reserved for the sidelink signal. At block 1508, if it is determined that the transmitting device does not have further transport blocks to send, then the method may include transmitting a signal to the receiving device explicitly releasing reserved resources for the sidelink signal. For example, the communication circuit 340 shown and described above in reference to FIG. 3, or the communication circuit 440 shown and described above in reference to FIG. 4, may transmit the one or more further transport blocks or may transmit the signal to the receiving device.

Figure 16:
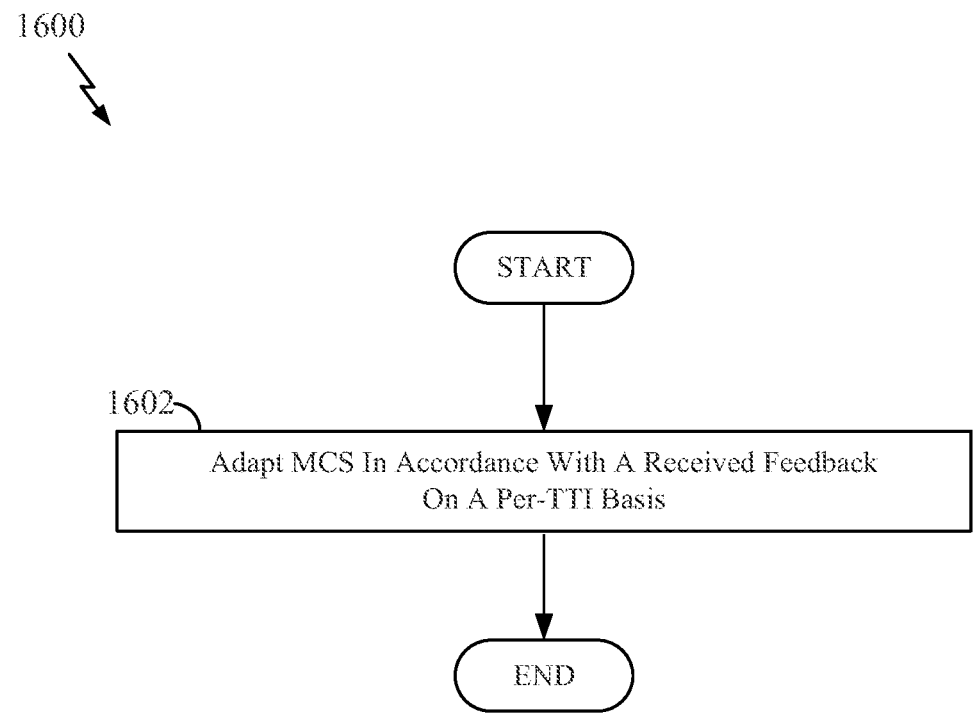
FIG. 16 is a flow chart illustrating one possible process for a transmitting device to adapt a transmission of a sidelink signal when feedback to the transmitter device comprises a CQI above a high threshold or below a low threshold according to some aspects of the present disclosure.

FIG. 16 is a flow chart illustrating one possible process 1600 for a transmitting device to adapt a transmission of a sidelink signal when feedback to the transmitter device comprises a CQI above a high threshold or below a low threshold according to some aspects of the present disclosure. The process 1600 is exemplary and not limiting. In FIG. 16, as described below, some or all illustrated features may be omitted in a particular implementation within the scope of the present disclosure, and some illustrated features may not be required for implementation of all aspects of the present disclosure. In the following description, a sidelink signal transmission is discussed with reference to a transmitting device and a receiving device. It will be understood that either device may be: the user equipment 126 and/or 128 illustrated in FIG. 1; the scheduling entity 202 illustrated in FIGS. 2 and 3; and/or the scheduled entity 204 illustrated in FIGS. 2 and 4. In some examples, the process 1600 may be carried out by any suitable apparatus or means for carrying out the functions or algorithm described below.

After transmitting, from a transmitting device, one or more transport blocks during a plurality of transmission time intervals (TTIs) utilizing sidelink-centric subframes and utilizing a given modulation and coding scheme (MCS), when the feedback received during each of the TTIs from a receiving device comprises a CQI above a high threshold or below a low threshold, a method may include, at block 1602, adapting (e.g., changing, altering) the MCS in accordance with the received feedback on a per-TTI basis. For example, the processing circuit 342 shown and described above in reference to FIG. 3, or the processing circuit 442 shown and described above in reference to FIG. 4, may adapt the MCS in accordance with the received feedback on a per-TTI basis.

Figure 17:
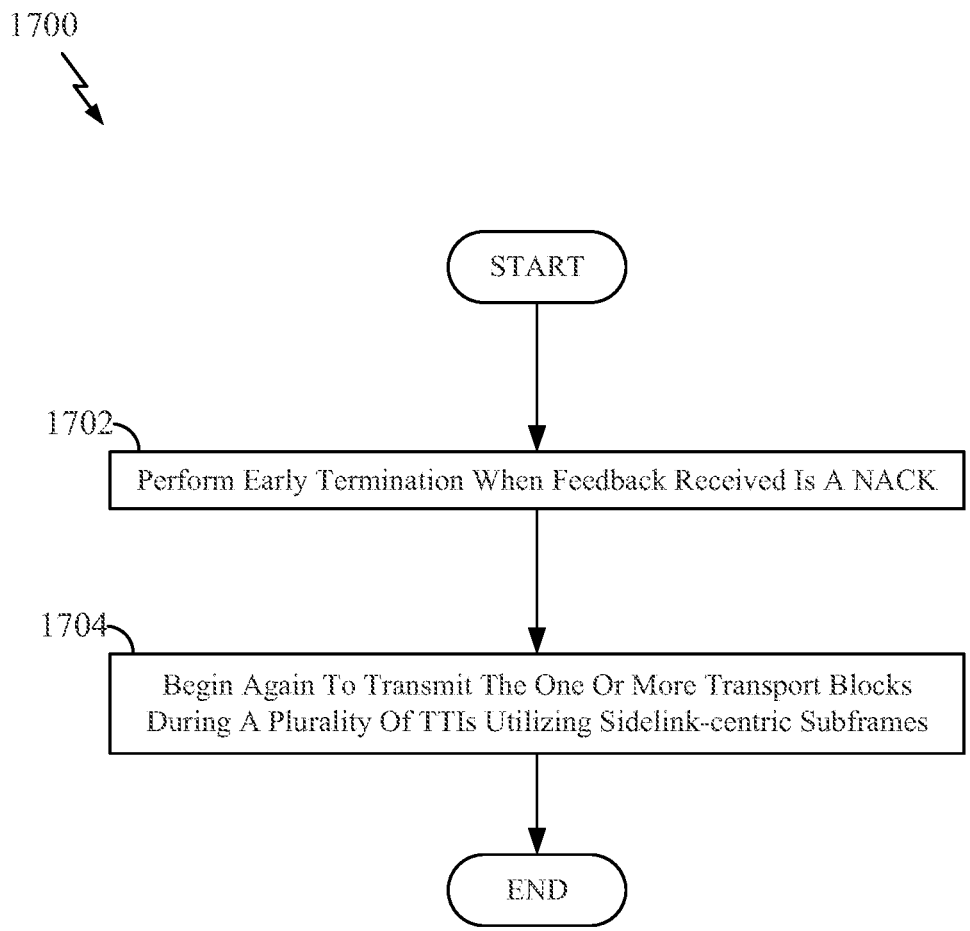
FIG. 17 is a flow chart illustrating one possible process for a transmitting device to adapt a transmission of a sidelink signal when feedback to the transmitter device comprises a NACK according to some aspects of the present disclosure.

FIG. 17 is a flow chart illustrating one possible process 1700 for a transmitting device to adapt a transmission of a sidelink signal when feedback to the transmitter device comprises a NACK according to some aspects of the present disclosure. The process 1700 is exemplary and not limiting. In FIG. 17, as described below, some or all illustrated features may be omitted in a particular implementation within the scope of the present disclosure, and some illustrated features may not be required for implementation of all aspects of the present disclosure. In the following description, a sidelink signal transmission is discussed with reference to a transmitting device and a receiving device. It will be understood that either device may be: the user equipment 126 and/or 128 illustrated in FIG. 1; the scheduling entity 202 illustrated in FIGS. 2 and 3; and/or the scheduled entity 204 illustrated in FIGS. 2 and 4. In some examples, the process 1700 may be carried out by any suitable apparatus or means for carrying out the functions or algorithm described below.

After transmitting, from a transmitting device, one or more transport blocks during a plurality of transmission time intervals (TTIs) utilizing sidelink-centric subframes and utilizing a given modulation and coding scheme (MCS), when the feedback received during each of the TTIs from a receiving device comprises a NACK, the method may include, at block 1702, performing early termination of the transmitting. At block 1704, the method may further include beginning again to transmit the one or more transport blocks during a plurality of TTIs utilizing sidelink-centric subframes. For example, the communication circuit 340 shown and described above in reference to FIG. 3, or the communication circuit 440 shown and described above in reference to FIG. 4, may perform early termination and begin again to transmit the one or more transport blocks during a plurality of TTIs utilizing sidelink-centric subframes.

Figure 18:
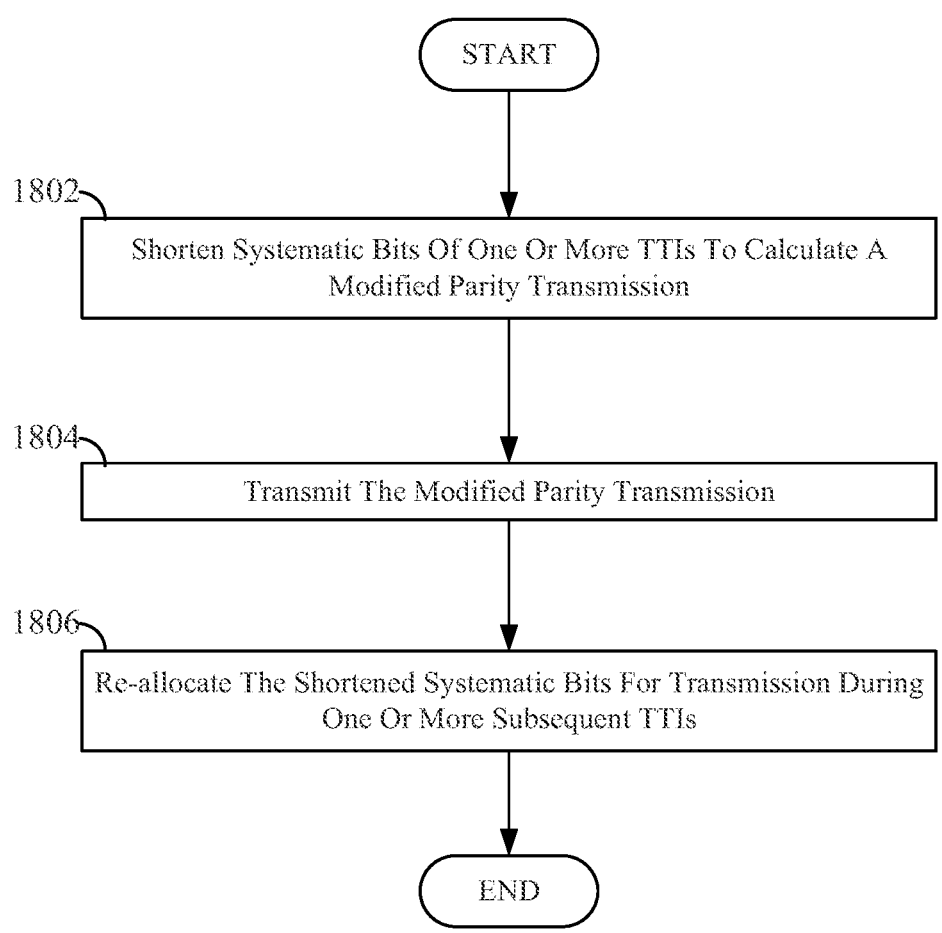
FIG. 18 is a flow chart illustrating one possible process for a transmitting device to adapt a transmission of a sidelink signal when feedback to the transmitter device comprises decoder state information for a decoder at the receiving device indicating that transmission of parity bits would be insufficient for decoding the transport block at the receiving device, according to some aspects of the present disclosure.

FIG. 18 is a flow chart illustrating one possible process 1800 for a transmitting device to adapt a transmission of a sidelink signal when feedback to the transmitter device comprises decoder state information for a decoder at the receiving device indicating that transmission of parity bits would be insufficient for decoding the transport block at the receiving device, according to some aspects of the present disclosure. The process 1800 is exemplary and not limiting. In FIG. 18, as described below, some or all illustrated features may be omitted in a particular implementation within the scope of the present disclosure, and some illustrated features may not be required for implementation of all aspects of the present disclosure. In the following description, a sidelink signal transmission is discussed with reference to a transmitting device and a receiving device. It will be understood that either device may be: the user equipment 126 and/or 128 illustrated in FIG. 1; the scheduling entity 202 illustrated in FIGS. 2 and 3; and/or the scheduled entity 204 illustrated in FIGS. 2 and 4. In some examples, the process 1800 may be carried out by any suitable apparatus or means for carrying out the functions or algorithm described below.

After transmitting, from a transmitting device, one or more transport blocks during a plurality of transmission time intervals (TTIs) utilizing sidelink-centric subframes and utilizing a given modulation and coding scheme (MCS), when the feedback received during each of the TTIs from a receiving device comprises decoder state information for a decoder at the receiving device indicating that transmission of parity bits would be insufficient for decoding the transport block at the receiving device, the method may include, at block 1802, shortening systematic bits of one or more TTIs to calculate a modified parity transmission. For example, the processing circuit 342 shown and described above in reference to FIG. 3, or the processing circuit 442 shown and described above in reference to FIG. 4, may perform the shortening of the systematic bits to calculate a modified parity transmission. The method may further include, at block 1804, transmitting the modified parity transmission. The method may further include, at block 1806, re-allocating the shortened systematic bits for transmission during one or more subsequent TTIs. For example, the communication circuit 340 shown and described above in reference to FIG. 3, or the communication circuit 440 shown and described above in reference to FIG. 4, may transmit the modified parity and re-allocate the shortened systematic bits for transmission during one or more subsequent TTIs.

Figure 19:
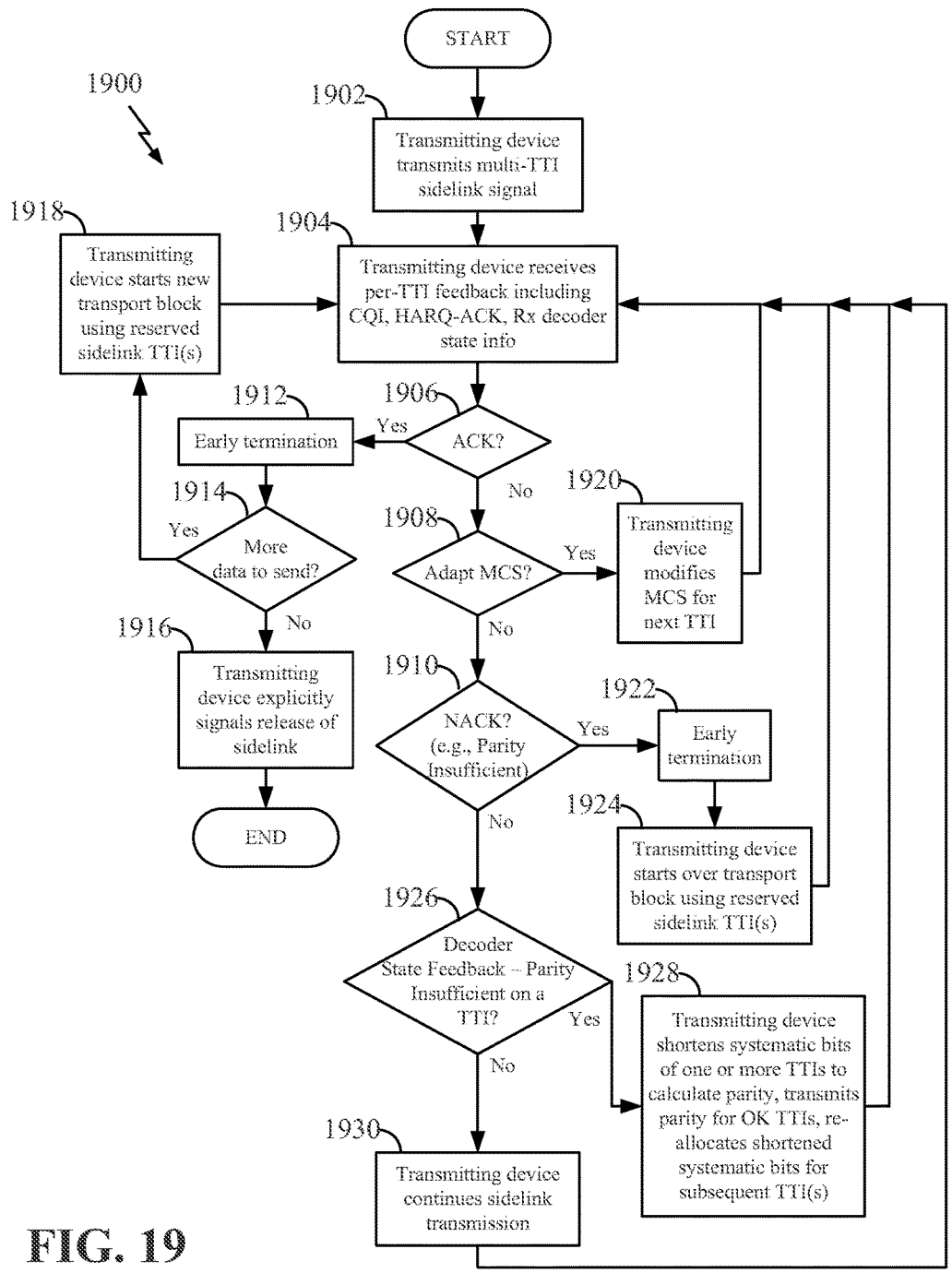
FIG. 19 is a flow chart illustrating a process for a user equipment transmitting a sidelink signal to employ rate/ coding adaptation based on per-TTI feedback of a sidelink signal transmission according to some aspects of the present disclosure.

FIG. 19 is a flow chart illustrating a process 1900 for a user equipment transmitting a sidelink signal to employ rate/coding adaptation based on per-TTI feedback of a sidelink signal transmission according to some aspects of the present disclosure. The process 1900 is exemplary and not limiting. FIG. 19, as described below, some or all illustrated features may be omitted in a particular implementation within the scope of the present disclosure, and some illustrated features may not be required for implementation of all aspects of the present disclosure. In the following description, a sidelink signal transmission is discussed with reference to a transmitting device and a receiving device. It will be understood that either device may be: the user equipment 126 and/or 128 illustrated in FIG. 1; the scheduling entity 202 illustrated in FIGS. 2 and 3; and/or the scheduled entity 204 illustrated in FIGS. 2 and 4. In some examples, the process 1900 may be carried out by any suitable apparatus or means for carrying out the functions or algorithm described below. For example, the communication circuit 340 shown and described above in reference to FIG. 3, or the communication circuit 440 shown and described above in reference to FIG. 4, may carry out any communication related aspects, including, but not limited to, for example, initiating transmission as at block 1902, receiving per-TTI feedback as at block 1904, modifying MCS for next TTI as at block 1920, early termination as at blocks 1912 and 1922, starting over a transport block using reserved sidelink TTIs as at block 1924, shortening systematic bits and reallocating the shortened systematic bits for subsequent TTIs as at block 1928, and/or continuing sidelink transmission as at block 1930, all as explained below. For example, the processing circuit 342 shown and described above in reference to FIG. 3, or the processing circuit 442 shown and described above in reference to FIG. 4, may carry out any processing related aspects, including, but not limited to, for example, determining whether the feedback received in the current TTI includes an ACK as at block 1906, determining whether feedback in the current TTI indicates that the MCS should be adapted or modified as at block 1908, determining whether the feedback in the current TTI includes a NACK as at block 1910, determining a value of any receiver decoder state feedback provided in a current TTI as at block 1926, and/or determining if the device has more data to send utilizing the sidelink as at block 1914, all as explained below.

At block 1902, the transmitting device may initiate transmission of one or more transport blocks utilizing a multi-TTI sidelink signal, e.g., utilizing the STS/DSS-DRS handshake procedure described above.

At block 1904, the transmitting device may receive per-TTI feedback including CQI information, HARQ-ACK information, Rx decoder state information, etc. In one example, the transmitting device may receive feedback during each of the TTIs (e.g., per-TTI feedback) from a receiving device, the feedback including one or more of an acknowledgment/negative acknowledgment (ACK/NACK), channel quality information (CQI), or decoder state information for a decoder at the receiving device. In another example, the transmitting device may receive feedback during each of the TTIs (e.g., per-TTI feedback) from a receiving device, the feedback including an acknowledgment/negative acknowledgment (ACK/NACK) and the feedback further including channel quality information (CQI) or decoder state information for a decoder at the receiving device. In the process that follows, in one example, it may be assumed that the following steps take place once for each TTI.

At block 1906, the transmitting device may determine whether the feedback received in the current TTI includes an ACK, indicating that the receiving device has successfully received and decoded the full transport block. If yes, then the process may proceed to block 1912. Here, if the block of TTIs reserved for the multi-TTI sidelink signal transmission of the transport block(s) has yet to fully complete, then the transmitting device may perform early termination, as described above. At block 1914, the transmitting device may determine if it has more data (e.g., one or more further transport blocks) to send utilizing the sidelink. If not, then the process may proceed to block 1916, and the transmitting device may explicitly signal the release of the sidelink, as described above. In other words, if the transmitting device does not have further transport blocks to send, the transmitting device may transmit a signal to the receiving device explicitly releasing reserved resources for the sidelink signal. On the other hand, if the transmitting device does have additional data to send, then at block 1918 the transmitting device may begin a new transport block utilizing the reserved sidelink TTI(s). Here, the process may return to block 1904 for the next TTI.

Referring now to block 1908, if the transmitting device does not find an ACK in the current TTI, the transmitting device may determine whether feedback in the current TTI indicates that the MCS should be adapted or modified. For example, if a CQI in the current TTI is low (e.g., a CQI below a low threshold), indicating poor channel conditions, the transmitting device may adapt the MCS utilizing a more robust modulation scheme and/or higher coding redundancy. On the other hand, if the CQI in the current TTI is high (e.g., a CQI above a high threshold), indicating favorable channel conditions, the transmitting device may adapt the MCS utilizing a less robust modulation scheme and/or lower coding redundancy. At block 1920, the transmitting device may accordingly modify the MCS for the next TTI, if needed, and the process may return to block 1904 for the next TTI.

Referring now to block 1910, the transmitting device may determine whether the feedback in the current TTI includes a NACK, indicating that the information in the TTI cannot be decoded, then the process may proceed to block 1922 and the transmitting device may perform early termination. At block 1924, the transmitting device may start over transmission of the transport block utilizing the reserved sidelink TTIs, and the process may return to block 1904 for the next TTI.

Referring now to block 1926, the transmitting device may determine the value of any receiver decoder state feedback provided in the current TTI. As described above, if the decoder state feedback indicates that any parity bits in subsequent TTIs would be insufficient for decoding of the TTI (e.g., indicating that transmission of parity bits would be insufficient for decoding the transport block at the receiving device), then the process may proceed to block 1928, wherein the transmitting device may shorten the systematic bits of one or more TTIs to calculate a modified parity transmission (e.g., calculation of modified parity bits). Thus, the transmitting device may transmit the parity bits in correspondence to TTIs that had sufficient quality for decoding, and may re-allocate the shortened systematic bits for transmission during one or more subsequent TTIs. Here the process may return to block 1904 for the next TTI.

Referring now to block 1930, if no adaptation of the sidelink signal transmission is needed, then the transmitting device may continue the sidelink signal transmission without adaptation and return to block 1904 for the next TTI.

In one configuration, a method of wireless communication may be operable at a transmitting device (e.g., a scheduled entity 204) utilizing a sidelink signal, where the method may include transmitting one or more transport blocks during a plurality of transmission time intervals (TTIs) utilizing sidelink-centric subframes and utilizing a given modulation and coding scheme (MCS). The method may further include receiving feedback during each of the TTIs from a receiving device. In one example, the feedback comprising one or more of an acknowledgment/negative acknowledgment (ACK/NACK), channel quality information (CQI), or decoder state information for a decoder at the receiving device. In another example, the feedback comprising an acknowledgment/negative acknowledgment (ACK/NACK) and further comprising channel quality information (CQI) or decoder state information for a decoder at the receiving device. The method may still further include adapting the transmitting on a per-TTI basis in accordance with the received feedback.

In one configuration, a transmitting device (e.g., a scheduled entity 204) configured for wireless communication utilizing a sidelink signal may include means for transmitting one or more transport blocks during a plurality of transmission time intervals (TTIs) utilizing sidelink-centric subframes and utilizing a given modulation and coding scheme (MCS), means for receiving feedback during each of the TTIs from a receiving device, the feedback comprising one or more of an acknowledgment/negative acknowledgment (ACK/NACK), channel quality information (CQI), or decoder state information for a decoder at the receiving device, and means for adapting the transmitting on a per-TTI basis in accordance with the received feedback. In one aspect, the aforementioned means may be the processor(s) 404 (e.g., including a communication circuit 440 and processing circuit 442) configured to perform the functions recited by the aforementioned means. In another aspect, the aforementioned means may be a circuit or any apparatus configured to perform the functions recited by the aforementioned means.

In one configuration, a computer-readable medium storing computer executable code at a transmitting device utilizing a sidelink signal may be implemented. The computer-executable code may include instructions for causing the transmitting device to transmit one or more transport blocks during a plurality of transmission time intervals (TTIs) utilizing sidelink-centric subframes and utilizing a given modulation and coding scheme (MCS). The computer-executable code may further include instructions for causing the transmitting device to receive feedback during each of the TTIs from a receiving device, the feedback comprising one or more of an acknowledgment/negative acknowledgment (ACK/NACK), channel quality information (CQI), or decoder state information for a decoder at the receiving device. In another example the computer-executable code may alternatively include instructions for causing the transmitting device to receive feedback during each of the TTIs from a receiving device, the feedback comprising an acknowledgment/negative acknowledgment (ACK/NACK), the feedback further comprising channel quality information (CQI) or decoder state information for a decoder at the receiving device. The computer-executable code may further include instructions for causing the transmitting device to adapt the transmit on a per-TTI basis in accordance with the received feedback. In one aspect, the aforementioned computer-executable code may be stored on the computer-readable medium 406 (e.g., including communication instructions 452 and processing instructions 454) configured to perform the functions recited by the aforementioned computer-executable code. In another aspect, the aforementioned computer-executable code may be stored on any memory device, where, for example, the memory device is coupled to a processor and the processor is configured to execute the computer-executable code stored on the memory device to perform the functions and/or processes described herein with respect to FIGS. 1-19.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-19 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a first user equipment (UE), comprising:
    transmitting a sidelink signal including sidelink data, from the first UE to a second UE without relaying the sidelink signal through a node in a radio access network, over one or more transport blocks during a plurality of transmission time intervals (TTIs), utilizing:
        sidelink-centric subframes that include communication resources utilized to communicate the sidelink data between the first UE and the second UE, wherein the communication resources include a sidelink broadcast channel, and
        a given modulation and coding scheme (MCS);
    receiving feedback, in a channel of the sidelink centric subframes dedicated to sidelink feedback during each of the TTIs from the second UE, the feedback comprising one or more of channel quality information (CQI), or decoder state information for a decoder at the second UE;
    and adapting the transmitting of the sidelink signal including sidelink-centric frames on a per-TTI basis in accordance with the feedback.

2. The method of claim 1, wherein, when the feedback comprises an ACK and the plurality of TTIs were reserved for the sidelink signal, the adapting the transmitting comprises at least one of:
    performing early termination of the transmitting of the sidelink signal during remaining TTIs reserved for the sidelink signal;
    if the first UE has one or more further transport blocks to send, transmitting the one or more further transport blocks during remaining TTIs reserved for the sidelink signal;
    and if the first UE does not have further transport blocks to send, transmitting a signal explicitly releasing reserved resources for the sidelink signal.

3. The method of claim 1, wherein, when the feedback comprises a CQI above a high threshold or below a low threshold, the adapting the transmitting comprises:
    adapting the MCS in accordance with the feedback on a per-TTI basis.

4. The method of claim 1, wherein, when the feedback comprises a NACK and the plurality of TTIs were reserved for the sidelink signal, the adapting the transmitting comprises:
    performing early termination of the transmitting of the sidelink signal during remaining TTIs of the plurality of TTIs reserved for the sidelink signal;
    and beginning again to transmit the one or more transport blocks during remaining TTIs of the plurality of TTIs reserved for the sidelink signal utilizing the sidelink-centric subframes.

5. The method of claim 1, wherein, when the feedback comprises decoder state information for a decoder at the second UE indicating that transmission of parity bits would be insufficient for decoding the transport block at the second UE, the adapting the transmitting comprises:
    shortening systematic bits of one or more TTIs to calculate a modified parity transmission;
    transmitting the modified parity transmission;
    and re-allocating the shortened systematic bits for transmission during one or more subsequent TTIs.

6. The method of claim 1, wherein, the adapting the transmitting comprises either:
    performing early termination based on receipt of an acknowledgement (ACK) signal from the second UE in a channel of a sidelink-centric subframe dedicated to sidelink feedback;
    or performing a coding adaptation based on receipt of the decoder state information from the second UE in the channel of the sidelink-centric subframe dedicated to sidelink feedback.

7. The method of claim 1, wherein, when the adapting the transmitting includes performing early termination based on receipt of an acknowledgement (ACK) signal, the method further comprises:

sending an explicit release signal to indicate that the first UE is releasing a sidelink resource.

8. The method of claim 1, wherein each of the one or more transport blocks are a fixed size.

9. A first user equipment (UE) configured for wireless communication utilizing a sidelink signal, comprising:
a processor;
a transceiver communicatively coupled to the processor; and a memory communicatively coupled to the processor, wherein the processor is configured to:
utilize the transceiver to transmit the sidelink signal including sidelink data, from the first UE to a second UE without relaying the sidelink signal through a node in a radio access network, over one or more transport blocks during a plurality of transmission time intervals (TTIs), utilizing:
sidelink-centric subframes that include communication resources utilized to communicate the sidelink data between the first UE and the second UE, wherein the communication resources include a sidelink broadcast channel,
and a given modulation and coding scheme (MCS);
utilize the transceiver to receive feedback in a channel of the sidelink centric subframes dedicated to sidelink feedback during each of the TTIs from the second UE, the feedback comprising one or more of channel quality information (CQI), or decoder state information for a decoder at the second UE;
and adapt the transmitting of the sidelink signal including sidelink-centric frames on a per-TTI basis in accordance with the feedback.

10. The first UE of claim 9, wherein, when the feedback comprises an ACK and the plurality of TTIs were reserved for the sidelink signal, the processor, being configured to adapt the transmitting, is further configured to at least one of:
perform early termination of the transmitting of the sidelink signal during remaining TTIs reserved for the sidelink signal;
if the first UE has one or more further transport blocks to send, utilize the transceiver to transmit the one or more further transport blocks during remaining TTIs reserved for the sidelink signal;
and if the first UE does not have further transport blocks to send, utilize the transceiver to transmit a signal explicitly releasing reserved resources for the sidelink signal.

11. The first UE of claim 9, wherein, when the feedback comprises a CQI above a high threshold or below a low threshold, the processor, being configured to adapt the transmitting, is further configured to:
adapt the MCS in accordance with the feedback on a per-TTI basis.

12. The first UE of claim 9, wherein, when the feedback comprises a NACK and the plurality of TTIs were reserved for the sidelink signal, the processor, being configured to adapt the transmitting, is further configured to:
perform early termination of the transmitting of the sidelink signal during remaining TTIs of the plurality of TTIs reserved for the sidelink signal;
and begin again to utilize the transceiver to transmit the one or more transport blocks during remaining TTIs of the plurality of TTIs reserved for the sidelink signal utilizing the sidelink-centric subframes.

13. The first UE of claim 9, wherein, when the feedback comprises decoder state information for a decoder at the second UE indicating that transmission of parity bits would be insufficient for decoding the transport block at the second UE, the processor, being configured to adapt the transmitting, is further configured to:
shorten systematic bits of one or more TTIs to calculate a modified parity transmission;
utilize the transceiver to transmit the modified parity transmission;
and re-allocate the shortened systematic bits for transmission during one or more subsequent TTIs.

14. The first UE of claim 9, wherein, the processor, being configured to adapt the transmitting, is further configured to either:
perform early termination based on receipt of an acknowledgement (ACK) signal from the second UE in a channel of a sidelink-centric subframe dedicated to sidelink feedback;
or perform a coding adaptation based on receipt of the decoder state information from the second UE in the channel of the sidelink-centric subframe dedicated to sidelink feedback.

15. The first UE of claim 9, wherein, when adapt the transmitting includes performing early termination based on receipt of an acknowledgement (ACK) signal, the processor, being configured to adapt the transmitting, is further configured to:
send an explicit release signal to indicate that the first UE is releasing a sidelink resource.

16. A first user equipment (UE) configured for wireless communication utilizing a sidelink signal, comprising:
means for transmitting the sidelink signal including sidelink data, from the first UE to a second UE without relaying the sidelink signal through a node in a radio access network, over one or more transport blocks during a plurality of transmission time intervals (TTIs), utilizing:
sidelink-centric subframes that include communication resources utilized to communicate the sidelink data between the first UE and the second UE, wherein the communication resources include a sidelink broadcast channel,
and a given modulation and coding scheme (MCS);
means for receiving feedback in a channel of the sidelink centric subframes dedicated to sidelink feedback during each of the TTIs from the second UE, the feedback comprising one or more of channel quality information (CQI), or decoder state information for a decoder at the second UE;
and means for adapting the transmitting of the sidelink signal including sidelink-centric frames on a per-TTI basis in accordance with the feedback.

17. The first UE of claim 16, wherein, when feedback comprises an ACK and the plurality of TTIs were reserved for the sidelink signal, the means for adapting the transmitting is further configured for:
performing early termination of the transmitting of the sidelink signal during remaining TTIs reserved for the sidelink signal;
if the first UE has one or more further transport blocks to send, transmitting the one or more further transport blocks during remaining TTIs reserved for the sidelink signal;
and if the first UE does not have further transport blocks to send, transmitting a signal explicitly releasing reserved resources for the sidelink signal.

18. The first UE of claim 16, wherein, when feedback comprises a CQI above a high threshold or below a low threshold, the means for adapting the transmitting is further configured for:
adapting the MCS in accordance with the feedback on a per-TTI basis.

19. The first UE of claim 16, wherein, when feedback comprises a NACK and the plurality of TTIs were reserved for the sidelink signal, the means for adapting the transmitting is further configured for:
performing early termination of the transmitting;
and beginning again to transmit the one or more transport blocks during remaining TTIs of the plurality of TTIs reserved for the sidelink signal utilizing the sidelink-centric subframes.

20. The first UE of claim 16, wherein, when feedback comprises decoder state information for a decoder at the second UE indicating that transmission of parity bits would be insufficient for decoding the transport block at the second UE, the means for adapting the transmitting is further configured for:
shortening systematic bits of one or more TTIs to calculate a modified parity transmission;
transmitting the modified parity transmission;
and re-allocating the shortened systematic bits for transmission during one or more subsequent TTIs.

21. The first UE of claim 16, wherein, the means for adapting the transmitting is further configured for either:
performing early termination based on receipt of an acknowledgement (ACK) signal from the second UE in a channel of a sidelink-centric subframe dedicated to sidelink feedback;
or performing a coding adaptation based on receipt of the decoder state information from the second UE in the channel of the sidelink-centric subframe dedicated to sidelink feedback.

22. The first UE of claim 16, wherein, when the means for adapting the transmitting is configured for performing early termination based on receipt of an acknowledgement (ACK) signal, the means for adapting the transmitting is further configured for:
sending an explicit release signal to indicate that the first UE is releasing a sidelink resource.

23. A non-transitory computer-readable medium storing computer-executable code at a first user equipment (UE), the computer-executable code comprising:
instructions for causing the first UE to transmit a sidelink signal including sidelink data, from the first UE to a second UE without relaying the sidelink signal through a node in a radio access network, over one or more transport blocks during a plurality of transmission time intervals (TTIs), utilizing:
sidelink-centric subframes that include communication resources utilized to communicate the sidelink data between the first UE and the second UE, wherein the communication resources include a sidelink broadcast channel,
and a given modulation and coding scheme (MCS);
instructions for causing the first UE to receive feedback in a channel of the sidelink centric subframes dedicated to sidelink feedback during each of the TTIs from the second UE, the feedback comprising one or more of channel quality information (CQI), or decoder state information for a decoder at the second UE;
and instructions for causing the first UE to adapt the transmit of the sidelink signal including sidelink-centric frames on a per-TTI basis in accordance with the feedback.

24. The non-transitory computer-readable medium of claim 23, wherein, when the feedback comprises an ACK and the plurality of TTIs were reserved for the sidelink signal, the instructions for causing the first UE to adapt the transmit further comprising at least one of:
instructions for performing early termination of the transmitting of the sidelink signal during remaining TTIs reserved for the sidelink signal;
instructions for, if the first UE has one or more further transport blocks to send, transmitting the one or more further transport blocks during remaining TTIs reserved for the sidelink signal;
and instructions for, if the first UE does not have further transport blocks to send, transmitting a signal explicitly releasing reserved resources for the sidelink signal.

25. The non-transitory computer-readable medium of claim 23, wherein, when the feedback comprises a CQI above a high threshold or below a low threshold, the instructions for causing the first UE to adapt the transmit further comprising:
instructions for adapting the MCS in accordance with the feedback on a per-TTI basis.

26. The non-transitory computer-readable medium of claim 23, wherein, when the feedback comprises a NACK and the plurality of TTIs were reserved for the sidelink signal, the instructions for causing the first UE to adapt the transmit further comprising:
instructions for performing early termination of the transmitting;
and instructions for beginning again to transmit the one or more transport blocks during remaining TTIs of the plurality of TTIs reserved for the sidelink signal utilizing the sidelinkcentric subframes.

27. The non-transitory computer-readable medium of claim 23, wherein, when the feedback comprises decoder state information for a decoder at the second UE indicating that transmission of parity bits would be insufficient for decoding the transport block at the second UE, the instructions for causing the first UE to adapt the transmit further comprising:
instructions for shortening systematic bits of one or more TTIs to calculate a modified parity transmission;
instructions for transmitting the modified parity transmission;
and instructions for re-allocating the shortened systematic bits for transmission during one or more subsequent TTIs.

28. The non-transitory computer-readable medium of claim 23, wherein, the instructions for causing the first UE to adapt the transmit include either:
instructions for performing early termination based on receipt of an acknowledgement (ACK) signal from the second UE in a channel of a sidelink-centric subframe dedicated to sidelink feedback;
or instructions for performing a coding adaptation based on receipt of the decoder state information from the second UE in the channel of the sidelink-centric subframe dedicated to sidelink feedback.

29. The non-transitory computer-readable medium of claim 23, wherein, when the instructions for causing the first UE to adapt the transmit include instructions for performing early termination based on receipt of an acknowledgement (ACK) signal, the instructions further comprising:

instructions for sending an explicit release signal to indicate that the first UE is releasing a sidelink resource.

* * * * *